US011042855B2

(12) United States Patent
Kim et al.

(10) Patent No.: US 11,042,855 B2
(45) Date of Patent: Jun. 22, 2021

(54) ELECTRONIC DEVICE AND REMITTANCE METHOD THEREOF

(71) Applicant: Samsung Electronics Co., Ltd., Gyeonggi-do (KR)

(72) Inventors: Yu Hwan Kim, Seoul (KR); Shin Wook Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 217 days.

(21) Appl. No.: 15/816,977

(22) Filed: Nov. 17, 2017

(65) Prior Publication Data
US 2018/0137488 A1 May 17, 2018

(30) Foreign Application Priority Data
Nov. 17, 2016 (KR) .......................... 10-2016-0153538

(51) Int. Cl.
*G06Q 20/14* (2012.01)
*G06Q 20/00* (2012.01)
(Continued)

(52) U.S. Cl.
CPC ............. *G06Q 20/14* (2013.01); *G06Q 20/00* (2013.01); *G06Q 20/3223* (2013.01); *G06Q 20/40145* (2013.01)

(58) Field of Classification Search
CPC ............. G06Q 20/40145; G06Q 20/34; G06Q 20/3278; G06Q 20/32; G06Q 20/3227;
(Continued)

(56) References Cited

U.S. PATENT DOCUMENTS

2010/0312547 A1* 12/2010 Van Os ................... G06F 3/167
704/9
2012/0130731 A1 5/2012 Canetto
(Continued)

FOREIGN PATENT DOCUMENTS

CA 2692677 A1 1/2011
EP 3035264 A1 6/2016
(Continued)

OTHER PUBLICATIONS

Synonyms of word "schedule" from google, 1 page, printed on Jun. 6, 2020.*
(Continued)

*Primary Examiner* — Alexander G Kalinowski
*Assistant Examiner* — Sanjeev Malhotra

(57) ABSTRACT

An electronic device includes a display, a communication circuit communicating with a server, a memory storing a first application for acquiring data and a second application for payment, a biometric sensor sensing biometric information, and a processor electrically connected with the display, the communication circuit, the memory, and the biometric sensor. The processor is configured to execute the first application, obtain remittance information including time information from the first application, authenticate a user of the electronic device based on the biometric information, which is obtained by the biometric sensor, using the second application if time corresponding to the time information arrives, and request remittance to the server based on at least a part of the remittance information using the communication circuit if the user of the electronic device is authenticated. Besides, it may be permissible to prepare other various embodiments speculated through the specification.

17 Claims, 15 Drawing Sheets

(51) Int. Cl.
*G06Q 20/32* (2012.01)
*G06Q 20/40* (2012.01)

(58) Field of Classification Search
CPC ............. G06Q 20/327; G06Q 20/227; G06Q 20/3224; G06Q 20/40; G06Q 20/401; G06Q 20/4014; G06Q 20/405; G06Q 20/10; G06Q 20/322; G06Q 20/3223; G06Q 20/36; G06Q 20/382; G06Q 20/4012; G06Q 20/20; G06Q 20/363; G06Q 20/38215; G06Q 20/3823; G06Q 20/3829; G06Q 20/02; G06Q 20/102; G06Q 20/12; G06Q 20/24; G06Q 20/3226; G06Q 20/325; G06Q 20/3255; G06Q 20/3274; G06Q 20/3276; G06Q 20/356; G06Q 20/3674; G06Q 20/38; G06Q 20/385; G06Q 40/02; H04W 12/06; H04W 4/80; G07F 9/023; G07F 19/206; H04L 63/0823; H04L 63/0861; H04L 63/0838; H04L 9/3247; G06F 21/32; G06F 21/445; G06F 3/167; G06K 9/00979; G10L 15/22; H04M 1/72522
USPC ....... 705/5, 39, 40, 44, 71, 72, 75; 701/465; 704/9; 713/156; 382/187; 345/173
See application file for complete search history.

(56) References Cited

U.S. PATENT DOCUMENTS

| | | | | |
|---|---|---|---|---|
| 2013/0275164 A1* | 10/2013 | Gruber | | G10L 17/22 705/5 |
| 2014/0244490 A1* | 8/2014 | Miller | | G06Q 20/102 705/40 |
| 2014/0278072 A1* | 9/2014 | Fino | | G01C 21/362 701/465 |
| 2014/0316987 A1 | 10/2014 | Davis et al. | | |
| 2014/0362011 A1* | 12/2014 | Niwa | | B42F 9/00 345/173 |
| 2015/0036928 A1* | 2/2015 | Sheth | | G06K 9/00442 382/187 |
| 2015/0095219 A1* | 4/2015 | Hurley | | G06Q 20/3823 705/39 |
| 2015/0120564 A1 | 4/2015 | Smith et al. | | |
| 2015/0222517 A1* | 8/2015 | McLaughlin | | G06F 11/3051 713/156 |
| 2015/0348001 A1* | 12/2015 | Van Os | | G06Q 30/0631 705/44 |
| 2016/0224966 A1* | 8/2016 | Van Os | | G06Q 20/3224 |
| 2016/0247144 A1* | 8/2016 | Oh | | G06Q 20/321 |
| 2016/0253651 A1* | 9/2016 | Park | | G07F 9/023 705/39 |
| 2016/0253652 A1* | 9/2016 | Je | | G06Q 20/321 705/39 |
| 2016/0253657 A1* | 9/2016 | Sohn | | G06Q 20/308 705/44 |
| 2016/0253664 A1* | 9/2016 | Yuan | | H04L 63/0281 705/71 |
| 2016/0253666 A1* | 9/2016 | Lee | | G06Q 20/3223 705/72 |
| 2016/0253669 A1* | 9/2016 | Yoon | | G06Q 20/327 705/75 |
| 2016/0253670 A1* | 9/2016 | Kim | | G06Q 20/38 705/72 |
| 2016/0254918 A1* | 9/2016 | Liu | | H04L 63/0823 713/156 |
| 2017/0017952 A1* | 1/2017 | Choi | | G06Q 20/321 |
| 2017/0053285 A1* | 2/2017 | Kim | | G06Q 20/38215 |
| 2017/0061436 A1* | 3/2017 | Liu | | G06Q 20/3227 |
| 2017/0061437 A1* | 3/2017 | Peng | | G06Q 20/4014 |
| 2017/0186015 A1* | 6/2017 | Jin | | G06Q 20/321 |
| 2017/0193314 A1* | 7/2017 | Kim | | G06F 21/32 |
| 2017/0244703 A1* | 8/2017 | Lee | | H04W 12/065 |
| 2017/0270524 A1* | 9/2017 | Kim | | G06Q 20/356 |
| 2017/0295174 A1* | 10/2017 | Kim | | G06F 21/46 |
| 2017/0330170 A1* | 11/2017 | Cho | | H04B 5/0031 |
| 2017/0330188 A1* | 11/2017 | Canh | | G06Q 20/385 |
| 2018/0032712 A1* | 2/2018 | Oh | | H04L 9/3231 |
| 2018/0033013 A1* | 2/2018 | Park | | G06Q 20/325 |
| 2018/0068312 A1* | 3/2018 | Kim | | G06Q 20/227 |

FOREIGN PATENT DOCUMENTS

| | | |
|---|---|---|
| KR | 20090085840 A | 8/2009 |
| KR | 10-2010-0011723 A | 2/2010 |
| KR | 10-2011-0136301 A | 12/2011 |
| KR | 10-2014-0066506 A | 6/2014 |

OTHER PUBLICATIONS

International Search Report dated Mar. 13, 2018 in connection with International Patent Application No. PCT/KR2017/012886.
Supplementary European Search Report dated Jun. 28, 2019 in connection with European Patent Application No. 17 87 2286, 7 pages.

* cited by examiner

ELECTRONIC DEVICE AND REMITTANCE METHOD THEREOF

CROSS-REFERENCE TO RELATED APPLICATION AND CLAIM OF PRIORITY

This application is related to and claims priority to Korean Patent Application No. 10-2016-0153538 filed on Nov. 17, 2016, the contents of which are incorporated herein by reference.

TECHNICAL FIELD

Various embodiments of the present disclosure relate to a remittance service provided by an electronic device.

BACKGROUND

With the development of information technology (IT), electronic devices have more enhanced functions and may provide a variety of functions for users. Electronic devices may provide network-based communication services, such as a multimedia service, a telephone call, wireless Internet, a short message service (SMS), a multimedia messaging service (MMS), and the like. In addition, electronic devices may also provide financial services in which financing techniques and IT technologies are integrated. For example, electronic devices may provide remittance services.

SUMMARY

To address the above-discussed deficiencies, it is a primary object to provide a scheduled remittance service to perform remittance at a specified time. In the case of using a scheduled remittance service, a user may schedule remittance by using an application of a financial institution and may perform authentication when scheduling the remittance. In this case, the user may not use a preferred user interface since the user has to schedule the remittance by using only a user interface provided by the financial institution. Furthermore, in the case where remittance contents are modified before a scheduled time, or in the case where a payment means has an insufficient account balance at the scheduled time, the user may have to perform a process for remittance (e.g., input of an account number, authentication, and the like) all over again. In addition, remittance that has to be cancelled may be automatically performed since there is no separate verification process at the scheduled time.

Aspects of the present disclosure are to address at least the above-mentioned problems and/or disadvantages and to provide at least the advantages described below. Accordingly, an aspect of the present disclosure is to provide an electronic device and a method for providing various user interfaces when providing a scheduled remittance service, and identifying a user at a scheduled time.

In accordance with an aspect of the present disclosure, an electronic device includes a display, a communication circuit that communicates with a server, a memory in which a first application for acquiring data and a second application for payment are stored, a biometric sensor that senses biometric information, and a processor electrically connected with the display, the communication circuit, the memory, and the biometric sensor. The processor is configured to execute the first application, to obtain remittance information including time information from the first application, to authenticate a user of the electronic device based on the biometric information, which is obtained by the biometric sensor, using the second application if time corresponding to the time information arrives, and to request remittance to the server based on at least a part of the remittance information using the communication circuit if the user of the electronic device is authenticated.

In accordance with another aspect of the present disclosure, a method includes executing a first application, obtaining remittance information including time information from the first application, authenticating a user of the electronic device based on biometric information using a second application for payment if time corresponding to the time information arrives, and requesting remittance to a server based on at least a part of the remittance information if the user of the electronic device is authenticated.

In accordance with another aspect of the present disclosure, an electronic device includes a display, a communication circuit that communicates with a server, a biometric sensor that senses biometric information, and a processor electrically connected with the display, the communication circuit, and the biometric sensor. The processor is configured to obtain remittance information including time information, to authenticate a user of the electronic device based on the biometric information, which is obtained by the biometric sensor, if time corresponding to the time information arrives, and to request remittance to the server based on at least a part of the remittance information using the communication circuit if the user of the electronic device is authenticated.

According to embodiments of the present disclosure described herein, by performing user authentication when a scheduled time arrives, it is possible to verify a user's intention and easily modify scheduled contents at the scheduled time.

Furthermore, by obtaining remittance information using a separate application distinguished from a payment application, it is possible to enhance user convenience in entering remittance information.

In addition, the present disclosure may provide various effects that are directly or indirectly recognized.

Other aspects, advantages, and salient features of the disclosure will become apparent to those skilled in the art from the following detailed description, which, taken in conjunction with the annexed drawings, discloses various embodiments of the present disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, it should be noted that like reference numbers are used to depict the same or similar elements, features, and structures.

DETAILED DESCRIPTION

Figure 1:
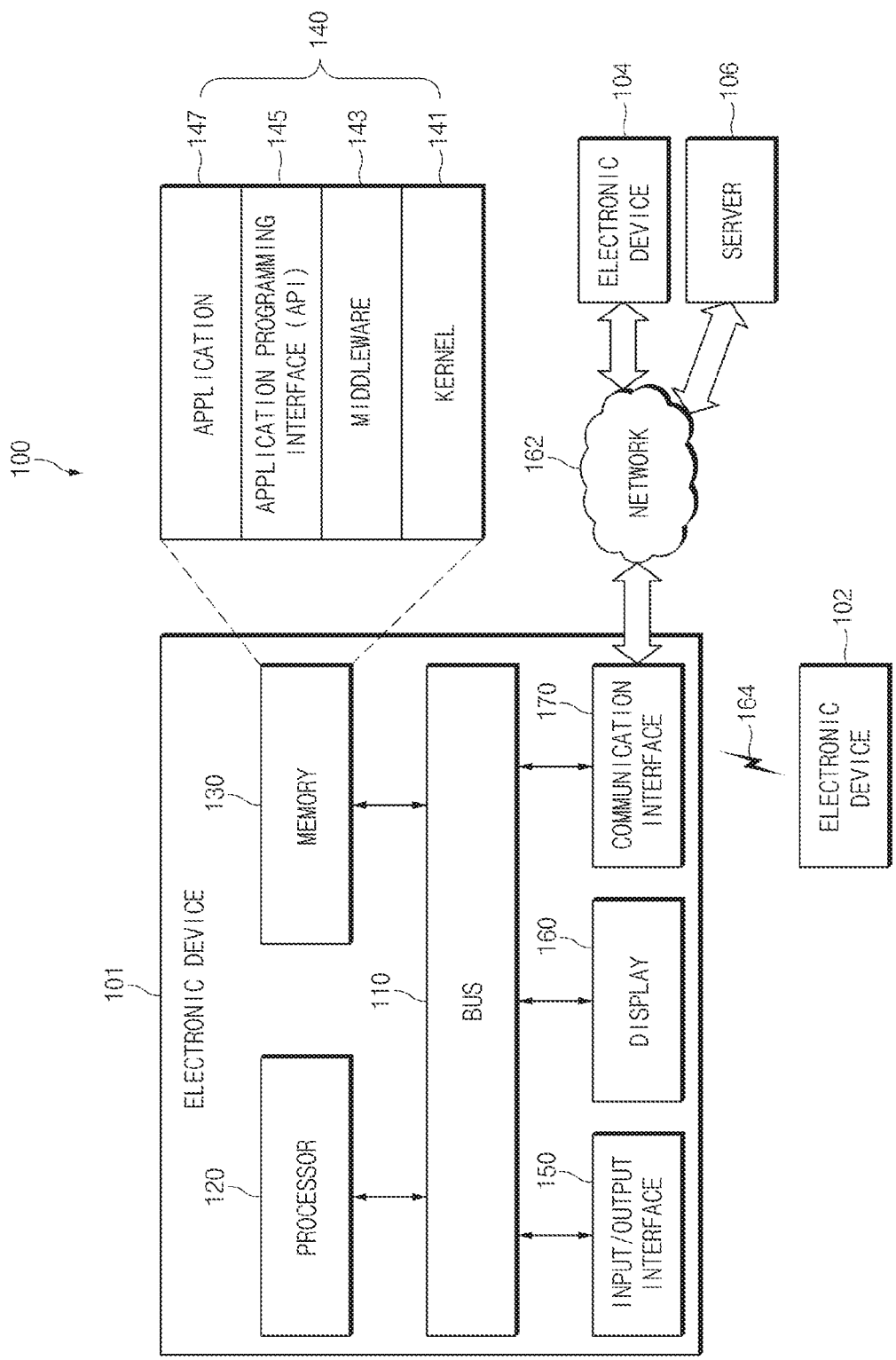
FIG. 1 illustrates an electronic device in a network environment according to various embodiments.

FIGS. 1 through 15, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

In this disclosure, the expressions "have", "may have", "include" and "comprise", or "may include" and "may comprise" used herein indicate existence of corresponding features (e.g., elements such as numeric values, functions, operations, or components) but do not exclude presence of additional features.

In this disclosure, the expressions "A or B", "at least one of A or/and B", or "one or more of A or/and B", and the like may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used in this disclosure may be used to refer to various elements regardless of the order and/or the priority and to distinguish the relevant elements from other elements, but do not limit the elements. For example, "a first user device" and "a second user device" indicate different user devices regardless of the order or priority. For example, without departing the scope of the present disclosure, a first element may be referred to as a second element, and similarly, a second element may be referred to as a first element.

It will be understood that when an element (e.g., a first element) is referred to as being "(operatively or communicatively) coupled with/to" or "connected to" another element (e.g., a second element), it may be directly coupled with/to or connected to the other element or an intervening element (e.g., a third element) may be present. In contrast, when an element (e.g., a first element) is referred to as being "directly coupled with/to" or "directly connected to" another element (e.g., a second element), it should be understood that there are no intervening element (e.g., a third element).

According to the situation, the expression "configured to" used in this disclosure may be used as, for example, the expression "suitable for", "having the capacity to", "designed to", "adapted to", "made to", or "capable of". The term "configured to" must not mean only "specifically designed to" in hardware. Instead, the expression "a device configured to" may mean that the device is "capable of" operating together with another device or other components. For example, a "processor configured to (or set to) perform A, B, and C" may mean a dedicated processor (e.g., an embedded processor) for performing a corresponding operation or a generic-purpose processor (e.g., a central processing unit (CPU) or an application processor) which performs corresponding operations by executing one or more software programs which are stored in a memory device.

Terms used in this disclosure are used to describe specified embodiments and are not intended to limit the scope of another embodiment. The terms of a singular form may include plural forms unless otherwise specified. All the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal unless expressly so defined in various embodiments of this disclosure. In some cases, even if terms are terms which are defined in this disclosure, they may not be interpreted to exclude embodiments of this disclosure.

An electronic device according to various embodiments of this disclosure may include at least one of, for example, smartphones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, or wearable devices. According to various embodiments, the wearable device may include at least one of an accessory type (e.g., watches, rings, bracelets, anklets, necklaces, glasses, contact lens, or head-mounted-devices (HMDs), a fabric or garment-integrated type (e.g., an electronic apparel), a body-attached type (e.g., a skin pad or tattoos), or a bio-implantable type (e.g., an implantable circuit).

According to various embodiments, the electronic device may be a home appliance. The home appliances may include at least one of, for example, televisions (TVs), digital versatile disc (DVD) players, audios, refrigerators, air conditioners, cleaners, ovens, microwave ovens, washing machines, air cleaners, set-top boxes, home automation control panels, security control panels, TV boxes (e.g., Samsung HomeSync™, Apple TV™, or Google TV™), game consoles (e.g., Xbox™ or PlayStation™), electronic dictionaries, electronic keys, camcorders, electronic picture frames, and the like.

According to another embodiment, an electronic device may include at least one of various medical devices (e.g., various portable medical measurement devices (e.g., a blood glucose monitoring device, a heartbeat measuring device, a blood pressure measuring device, a body temperature measuring device, and the like), a magnetic resonance angiography (MRA), a magnetic resonance imaging (MRI), a computed tomography (CT), scanners, and ultrasonic devices), navigation devices, Global Navigation Satellite System (GNSS), event data recorders (EDRs), flight data recorders (FDRs), vehicle infotainment devices, electronic equipment for vessels (e.g., navigation systems and gyrocompasses), avionics, security devices, head units for vehicles, industrial or home robots, automatic teller's machines (ATMs), points of sales (POSs) of stores, or internet of things (e.g., light bulbs, various sensors, electric or gas meters, sprinkler devices, fire alarms, thermostats, street lamps, toasters, exercise equipment, hot water tanks, heaters, boilers, and the like).

According to an embodiment, the electronic device may include at least one of parts of furniture or buildings/structures, electronic boards, electronic signature receiving devices, projectors, or various measuring instruments (e.g., water meters, electricity meters, gas meters, or wave meters, and the like). According to various embodiments, the electronic device may be one of the above-described devices or a combination thereof. An electronic device according to an embodiment may be a flexible electronic device. Furthermore, an electronic device according to an embodiment of this disclosure may not be limited to the above-described electronic devices and may include other electronic devices and new electronic devices according to the development of technologies.

Hereinafter, electronic devices according to various embodiments will be described with reference to the accompanying drawings. In this disclosure, the term "user" may refer to a person who uses an electronic device or may refer to a device (e.g., an artificial intelligence electronic device) that uses the electronic device.

FIG. 1 illustrates an electronic device in a network environment, according to various embodiments.

Referring to FIG. 1, according to various embodiments, an electronic device 101, 102, 104, or a server 106 may be connected with each other over a network 162 or local wireless communication 164. The electronic device 101 may include a bus 110, a processor 120, a memory 130, an input/output interface 150, a display 160, and a communication interface 170. According to an embodiment, the electronic device 101 may not include at least one of the above-described elements or may further include other element(s).

For example, the bus 110 may interconnect the above-described elements 110 to 170 and may include a circuit for conveying communications (e.g., a control message and/or data) among the above-described elements.

The processor 120 may include one or more of a central processing unit (CPU), an application processor (AP), or a communication processor (CP). For example, the processor 120 may perform an arithmetic operation or data processing associated with control and/or communication of at least other elements of the electronic device 101.

The memory 130 may include a volatile and/or nonvolatile memory. For example, the memory 130 may store instructions or data associated with at least one other element(s) of the electronic device 101. According to an embodiment, the memory 130 may store software and/or a program 140. The program 140 may include, for example, a kernel 141, a middleware 143, an application programming interface (API) 145, and/or an application program (or "an application") 147. At least a part of the kernel 141, the middleware 143, or the API 145 may be referred to as an "operating system (OS)".

For example, the kernel 141 may control or manage system resources (e.g., the bus 110, the processor 120, the memory 130, and the like) that are used to execute operations or functions of other programs (e.g., the middleware 143, the API 145, and the application program 147). Furthermore, the kernel 141 may provide an interface that allows the middleware 143, the API 145, or the application program 147 to access discrete elements of the electronic device 101 so as to control or manage system resources.

The middleware 143 may perform, for example, a mediation role such that the API 145 or the application program 147 communicates with the kernel 141 to exchange data.

Furthermore, the middleware 143 may process one or more task requests received from the application program 147 according to a priority. For example, the middleware 143 may assign the priority, which makes it possible to use a system resource (e.g., the bus 110, the processor 120, the memory 130, or the like) of the electronic device 101, to at least one of the application program 147. For example, the middleware 143 may process the one or more task requests according to the priority assigned to the at least one, which makes it possible to perform scheduling or load balancing on the one or more task requests.

The API 145 may be, for example, an interface through which the application program 147 controls a function provided by the kernel 141 or the middleware 143, and may include, for example, at least one interface or function (e.g., an instruction) for a file control, a window control, image processing, a character control, or the like.

The input/output interface 150 may play a role, for example, an interface which transmits an instruction or data input from a user or another external device, to other element(s) of the electronic device 101. Furthermore, the input/output interface 150 may output an instruction or data, received from other element(s) of the electronic device 101, to a user or another external device.

The display 160 may include, for example, a liquid crystal display (LCD), a light-emitting diode (LED) display, an organic LED (OLED) display, a microelectromechanical systems (MEMS) display, or an electronic paper display. The display 160 may display, for example, various contents (e.g., a text, an image, a video, an icon, a symbol, and the like) to a user. The display 160 may include a touch screen and may receive, for example, a touch, gesture, proximity, or hovering input using an electronic pen or a part of a user's body.

For example, the communication interface 170 may establish communication between the electronic device 101 and an external device (e.g., the first external electronic device 102, the second external electronic device 104, or the server 106). For example, the communication interface 170 may be connected to the network 162 over wireless communication or wired communication to communicate with the external device (e.g., the second external electronic device 104 or the server 106).

The wireless communication may use at least one of, for example, long-term evolution (LTE), LTE Advanced (LTE-A), Code Division Multiple Access (CDMA), Wideband CDMA (WCDMA), Universal Mobile Telecommunications System (UMTS), Wireless Broadband (WiBro), Global System for Mobile Communications (GSM), or the like, as cellular communication protocol. Furthermore, the wireless communication may include, for example, the local wireless communication 164. The local wireless communication 164 may include at least one of wireless fidelity (Wi-Fi), Bluetooth, near field communication (NFC), magnetic stripe transmission (MST), or the like.

The MST may generate a pulse in response to transmission data using an electromagnetic signal, and the pulse may generate a magnetic field signal. The electronic device 101 may transfer the magnetic field signal to point of sale (POS), and the POS may detect the magnetic field signal using a MST reader. The POS may recover the data by converting the detected magnetic field signal to an electrical signal.

The GNSS may include, for example, a global positioning system (GPS), a global navigation satellite system (Glonass), a Beidou navigation satellite system (hereinafter referred to as "Beidou"), or an European global satellite-based navigation system (hereinafter referred to as "Galileo"). Hereinafter, in this disclosure, "GPS" and "GNSS" may be interchangeably used. The wired communication may include at least one of, for example, a universal serial bus (USB), a high definition multimedia interface (HDMI), a recommended standard-232 (RS-232), a plain old telephone service (POTS), or the like. The network 162 may include at least one of telecommunications networks, for example, a computer network (e.g., LAN or WAN), an Internet, or a telephone network.

Each of the first and second external electronic devices 102 and 104 may be a device of which the type is different from or the same as that of the electronic device 101. According to an embodiment, the server 106 may include a group of one or more servers. According to various embodiments, all or a portion of operations that the electronic device 101 will perform may be executed by another or plural electronic devices (e.g., the electronic device 102 or 104 or the server 106). According to an embodiment, in the case where the electronic device 101 executes any function or service automatically or in response to a request, the electronic device 101 may not perform the function or the service internally, but, alternatively additionally, it may request at least a portion of a function associated with the electronic device 101 at other electronic device (e.g., the electronic device 102 or 104 or the server 106). The other electronic device (e.g., the electronic device 102 or 104 or the server 106) may execute the requested function or additional function and may transmit the execution result to the electronic device 101. The electronic device 101 may provide the requested function or service using the received result or may additionally process the received result to provide the requested function or service. To this end, for example, cloud computing, distributed computing, or client-server computing may be used.

Figure 2:
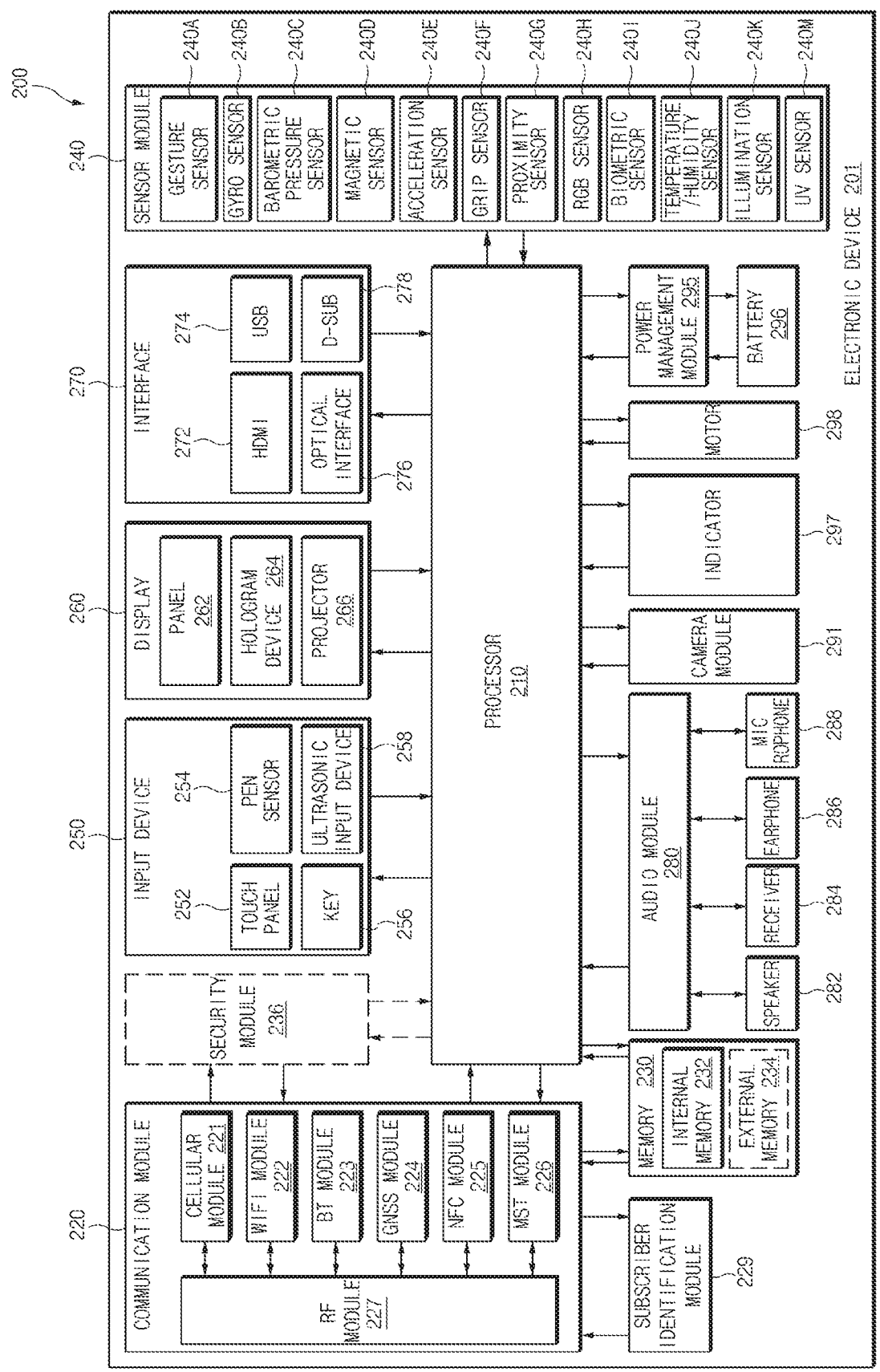
FIG. 2 illustrates a block diagram of an electronic device according to various embodiments.

FIG. 2 illustrates a block diagram of an electronic device, according to various embodiments.

Referring to FIG. 2, an electronic device 201 may include, for example, all or a part of the electronic device 101 illustrated in FIG. 1. The electronic device 201 may include one or more processors (e.g., an application processor (AP)) 210, a communication module 220, a subscriber identification module 229, a memory 230, a sensor module 240, an input device 250, a display 260, an interface 270, an audio module 280, a camera module 291, a power management module 295, a battery 296, an indicator 297, and a motor 298.

The processor 210 may drive, for example, an operating system (OS) or an application to control a plurality of hardware or software elements connected to the processor 210 and may process and compute a variety of data. For example, the processor 210 may be implemented with a System on Chip (SoC). According to an embodiment, the processor 210 may further include a graphic processing unit (GPU) and/or an image signal processor. The processor 210 may include at least a part (e.g., a cellular module 221) of elements illustrated in FIG. 2. The processor 210 may load an instruction or data, which is received from at least one of other elements (e.g., a nonvolatile memory), into a volatile memory and process the loaded instruction or data. The processor 210 may store a variety of data in the nonvolatile memory.

The communication module 220 may be configured the same as or similar to the communication interface 170 of FIG. 1. The communication module 220 may include the cellular module 221, a Wi-Fi module 222, a Bluetooth (BT) module 223, a GNSS module 224 (e.g., a GPS module, a Glonass module, a Beidou module, or a Galileo module), a near field communication (NFC) module 225, a MST module 226 and a radio frequency (RF) module 227.

The cellular module 221 may provide, for example, voice communication, video communication, a character service, an Internet service, or the like over a communication network. According to an embodiment, the cellular module 221 may perform discrimination and authentication of the electronic device 201 within a communication network by using the subscriber identification module (e.g., a SIM card) 229. According to an embodiment, the cellular module 221 may perform at least a portion of functions that the processor 210 provides. According to an embodiment, the cellular module 221 may include a communication processor (CP).

Each of the Wi-Fi module 222, the BT module 223, the GNSS module 224, the NFC module 225, or the MST module 226 may include a processor for processing data exchanged through a corresponding module, for example. According to an embodiment, at least a part (e.g., two or more) of the cellular module 221, the Wi-Fi module 222, the BT module 223, the GNSS module 224, the NFC module 225, and the MST module 226 may be included within one Integrated Circuit (IC) or an IC package.

For example, the RF module 227 may transmit and receive a communication signal (e.g., an RF signal). For example, the RF module 227 may include a transceiver, a power amplifier module (PAM), a frequency filter, a low noise amplifier (LNA), an antenna, or the like. According to another embodiment, at least one of the cellular module 221, the Wi-Fi module 222, the BT module 223, the GNSS module 224, the NFC module 225, or the MST module 226 may transmit and receive an RF signal through a separate RF module.

The subscriber identification module 229 may include, for example, a card and/or embedded SIM that includes a subscriber identification module and may include unique identify information (e.g., integrated circuit card identifier (ICCID)) or subscriber information (e.g., international mobile subscriber identity (IMSI)).

The memory 230 (e.g., the memory 130) may include an internal memory 232 or an external memory 234. For example, the internal memory 232 may include at least one of a volatile memory (e.g., a dynamic random access memory (DRAM), a static RAM (SRAM), a synchronous DRAM (SDRAM), or the like), a nonvolatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory or a NOR flash memory), or the like), a hard drive, or a solid state drive (SSD).

The external memory 234 may further include a flash drive such as compact flash (CF), secure digital (SD), micro secure digital (Micro-SD), mini secure digital (Mini-SD), extreme digital (xD), a multimedia card (MMC), a memory stick, or the like. The external memory 234 may be operatively and/or physically connected to the electronic device 201 through various interfaces.

A security module 236 may be a module that includes a storage space of which a security level is higher than that of the memory 230 and may be a circuit that guarantees safe data storage and a protected execution environment. The security module 236 may be implemented with a separate circuit and may include a separate processor. For example, the security module 236 may be in a smart chip or a secure digital (SD) card, which is removable, or may include an embedded secure element (eSE) embedded in a fixed chip of the electronic device 201. Furthermore, the security module 236 may operate based on an operating system (OS) that is different from the OS of the electronic device 201. For example, the security module 236 may operate based on java card open platform (JCOP) OS.

The sensor module 240 may measure, for example, a physical quantity or may detect an operation state of the electronic device 201. The sensor module 240 may convert the measured or detected information to an electric signal. For example, the sensor module 240 may include at least one of a gesture sensor 240A, a gyro sensor 240B, a barometric pressure sensor 240C, a magnetic sensor 240D, an acceleration sensor 240E, a grip sensor 240F, the proximity sensor 240G, a color sensor 240H (e.g., red, green, blue (RGB) sensor), a biometric sensor 240I, a temperature/humidity sensor 240J, an illuminance sensor 240K, or an UV sensor 240M. Although not illustrated, additionally or generally, the sensor module 240 may further include, for example, an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 240 may further include a control circuit for controlling at least one or more sensors included therein. According to an embodiment, the electronic device 201 may further include a processor that is a part of the processor 210 or independent of the processor 210 and is configured to control the sensor module 240. The processor may control the sensor module 240 while the processor 210 remains at a sleep state.

The input device 250 may include, for example, a touch panel 252, a (digital) pen sensor 254, a key 256, or an ultrasonic input device 258. For example, the touch panel 252 may use at least one of capacitive, resistive, infrared and ultrasonic detecting methods. Also, the touch panel 252 may further include a control circuit. The touch panel 252 may further include a tactile layer to provide a tactile reaction to a user.

The (digital) pen sensor 254 may be, for example, a part of a touch panel or may include an additional sheet for recognition. The key 256 may include, for example, a physical button, an optical key, or a keypad. The ultrasonic input device 258 may detect (or sense) an ultrasonic signal, which is generated from an input device, through a microphone (e.g., a microphone 288) and may check data corresponding to the detected ultrasonic signal.

The display 260 (e.g., the display 160) may include a panel 262, a hologram device 264, or a projector 266. The panel 262 may be the same as or similar to the display 160 illustrated in FIG. 1. The panel 262 may be implemented, for example, to be flexible, transparent or wearable. The panel 262 and the touch panel 252 may be integrated into a single module. The hologram device 264 may display a stereoscopic image in a space using a light interference phenomenon. The projector 266 may project light onto a screen so as to display an image. For example, the screen may be arranged in the inside or the outside of the electronic device 201. According to an embodiment, the display 260 may further include a control circuit for controlling the panel 262, the hologram device 264, or the projector 266.

The interface 270 may include, for example, a high-definition multimedia interface (HDMI) 272, a universal serial bus (USB) 274, an optical interface 276, or a D-sub-miniature (D-sub) 278. The interface 270 may be included, for example, in the communication interface 170 illustrated in FIG. 1. Additionally or generally, the interface 270 may include, for example, a mobile high definition link (MHL) interface, a SD card/multi-media card (MMC) interface, or an infrared data association (IrDA) standard interface.

The audio module 280 may convert a sound and an electric signal in dual directions. At least a part of the audio module 280 may be included, for example, in the input/output interface 150 illustrated in FIG. 1. The audio module 280 may process, for example, sound information that is input or output through a speaker 282, a receiver 284, an earphone 286, or the microphone 288.

For example, the camera module 291 may shoot a still image or a video. According to an embodiment, the camera module 291 may include at least one or more image sensors (e.g., a front sensor or a rear sensor), a lens, an image signal processor (ISP), or a flash (e.g., an LED or a xenon lamp).

The power management module 295 may manage, for example, power of the electronic device 201. According to an embodiment, a power management integrated circuit (PMIC), a charger IC, or a battery or fuel gauge may be included in the power management module 295. The PMIC may have a wired charging method and/or a wireless charging method. The wireless charging method may include, for example, a magnetic resonance method, a magnetic induction method or an electromagnetic method and may further include an additional circuit, for example, a coil loop, a resonant circuit, a rectifier, or the like. The battery gauge may measure, for example, a remaining capacity of the battery 296 and a voltage, current or temperature thereof while the battery is charged. The battery 296 may include, for example, a rechargeable battery and/or a solar battery.

The indicator 297 may display a specific state of the electronic device 201 or a part thereof (e.g., the processor 210), such as a booting state, a message state, a charging state, and the like. The motor 298 may convert an electrical signal into a mechanical vibration and may generate the following effects: vibration, haptic, and the like. Although not illustrated, a processing device (e.g., a GPU) for supporting a mobile TV may be included in the electronic device 201. The processing device for supporting the mobile TV may process media data according to the standards of digital multimedia broadcasting (DMB), digital video broadcasting (DVB), MediaFLO™, or the like.

Each of the above-mentioned elements of the electronic device according to various embodiments of the present disclosure may be configured with one or more components, and the names of the elements may be changed according to the type of the electronic device. In various embodiments, the electronic device may include at least one of the above-mentioned elements, and some elements may be omitted or other additional elements may be added. Furthermore, some of the elements of the electronic device according to various embodiments may be combined with each other so as to form one entity, so that the functions of the elements may be performed in the same manner as before the combination.

Figure 3:
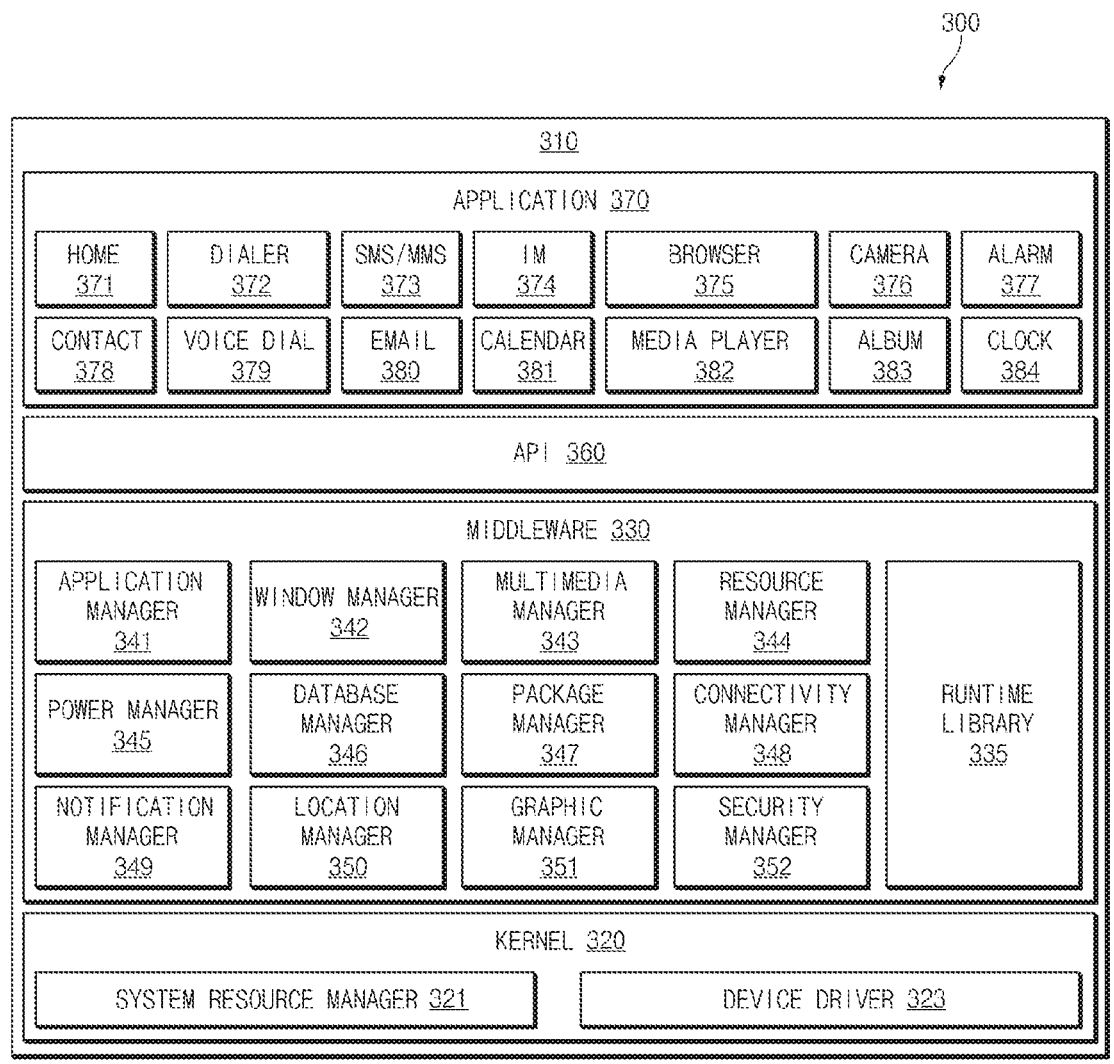
FIG. 3 illustrates a block diagram of a program module according to various embodiments.

FIG. 3 illustrates a block diagram of a program module, according to various embodiments.

According to an embodiment, a program module 310 (e.g., the program 140) may include an operating system (OS) to control resources associated with an electronic device (e.g., the electronic device 101), and/or diverse applications (e.g., the application program 147) driven on the OS. The OS may be, for example, Android, iOS, Windows, Symbian, or Tizen.

The program module 310 may include a kernel 320, a middleware 330, an application programming interface (API) 360, and/or an application 370. At least a portion of the program module 310 may be preloaded on an electronic device or may be downloadable from an external electronic device (e.g., the electronic device 102 or 104, the server 106, or the like).

The kernel 320 (e.g., the kernel 141) may include, for example, a system resource manager 321 or a device driver 323. The system resource manager 321 may control, allocate, or retrieve system resources. According to an embodiment, the system resource manager 321 may include a process managing unit, a memory managing unit, a file system managing unit, or the like. The device driver 323 may include, for example, a display driver, a camera driver, a Bluetooth driver, a shared memory driver, a USB driver, a keypad driver, a Wi-Fi driver, an audio driver, or an inter-process communication (IPC) driver.

The middleware 330 may provide, for example, a function that the application 370 needs in common, or may provide diverse functions to the application 370 through the API 360 to allow the application 370 to efficiently use limited system resources of the electronic device. According to an embodiment, the middleware 330 (e.g., the middleware 143) may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, a security manager 352, or a payment manager 354.

The runtime library 335 may include, for example, a library module that is used by a compiler to add a new function through a programming language while the application 370 is being executed. The runtime library 335 may perform input/output management, memory management, or capacities about arithmetic functions.

The application manager 341 may manage, for example, a life cycle of at least one application of the application 370. The window manager 342 may manage a graphic user interface (GUI) resource that is used in a screen. The multimedia manager 343 may identify a format necessary for playing diverse media files, and may perform encoding or decoding of media files by using a codec suitable for the format. The resource manager 344 may manage resources such as a storage space, memory, or source code of at least one application of the application 370.

The power manager 345 may operate, for example, with a basic input/output system (BIOS) to manage a battery or power, and may provide power information for an operation of an electronic device. The database manager 346 may generate, search for, or modify database that is to be used in at least one application of the application 370. The package manager 347 may install or update an application that is distributed in the form of package file.

The connectivity manager 348 may manage, for example, wireless connection such as Wi-Fi or Bluetooth. The notification manager 349 may display or notify an event such as arrival message, appointment, or proximity notification in a mode that does not disturb a user. The location manager 350 may manage location information about an electronic device. The graphic manager 351 may manage a graphic effect that is provided to a user, or manage a user interface relevant thereto. The security manager 352 may provide a general security function necessary for system security, user authentication, or the like. According to an embodiment, in the case where an electronic device (e.g., the electronic device 101) includes a telephony function, the middleware 330 may further include a telephony manager for managing a voice or video call function of the electronic device.

The middleware 330 may include a middleware module that combines diverse functions of the above-described elements. The middleware 330 may provide a module specialized to each OS kind to provide differentiated functions. Additionally, the middleware 330 may dynamically remove a part of the preexisting elements or may add new elements thereto.

The API 360 (e.g., the API 145) may be, for example, a set of programming functions and may be provided with a configuration that is variable depending on an OS. For example, in the case where an OS is the android or the iOS, it may provide one API set per platform. In the case where an OS is the tizen, it may provide two or more API sets per platform.

The application 370 (e.g., the application program 147) may include, for example, one or more applications capable of providing functions for a home 371, a dialer 372, an SMS/MMS 373, an instant message (IM) 374, a browser 375, a camera 376, an alarm 377, a contact 378, a voice dial 379, an e-mail 380, a calendar 381, a media player 382, an album 383, a timepiece 384, a payment 385, health care (e.g., measuring an exercise quantity, blood sugar, or the like) or offering of environment information (e.g., information of barometric pressure, humidity, temperature, or the like).

According to an embodiment, the application 370 may include an application (hereinafter referred to as "information exchanging application" for descriptive convenience) to support information exchange between an electronic device (e.g., the electronic device 101) and an external electronic device (e.g., the electronic device 102 or 104). The information exchanging application may include, for example, a notification relay application for transmitting specific information to an external electronic device, or a device management application for managing the external electronic device.

For example, the notification relay application may include a function of transmitting notification information, which arise from other applications (e.g., applications for SMS/MMS, e-mail, health care, or environmental information), to an external electronic device (e.g., the electronic device 102 or 104). Additionally, the notification relay application may receive, for example, notification information from an external electronic device and provide the notification information to a user.

The device management application may manage (e.g., install, delete, or update), for example, at least one function (e.g., turn-on/turn-off of an external electronic device itself (or a part of components) or adjustment of brightness (or resolution) of a display) of the external electronic device which communicates with the electronic device, an application running in the external electronic device, or a service (e.g., a call service, a message service, or the like) provided from the external electronic device (e.g., the electronic device 102 or 104).

According to an embodiment, the application 370 may include an application (e.g., a health care application of a mobile medical device) that is assigned in accordance with an attribute of an external electronic device (e.g., the electronic device 102 or 104). According to an embodiment, the application 370 may include an application that is received from an external electronic device (e.g., the server 106 or the electronic device 102 or 104). According to an embodiment, the application 370 may include a preloaded application or a third party application that is downloadable from a server. The names of elements of the program module 310 according to the embodiment may be modifiable depending on kinds of operating systems.

According to various embodiments, at least a portion of the program module 310 may be implemented by software, firmware, hardware, or a combination of two or more thereof. At least a portion of the program module 310 may be implemented (e.g., executed), for example, by the processor (e.g., the processor 210). At least a portion of the program module 310 may include, for example, modules, programs, routines, sets of instructions, processes, or the like for performing one or more functions.

Hereinafter, a configuration of hardware and software modules of an electronic device according to an embodiment will be described with reference to FIGS. 4 and 5.

Figure 4:
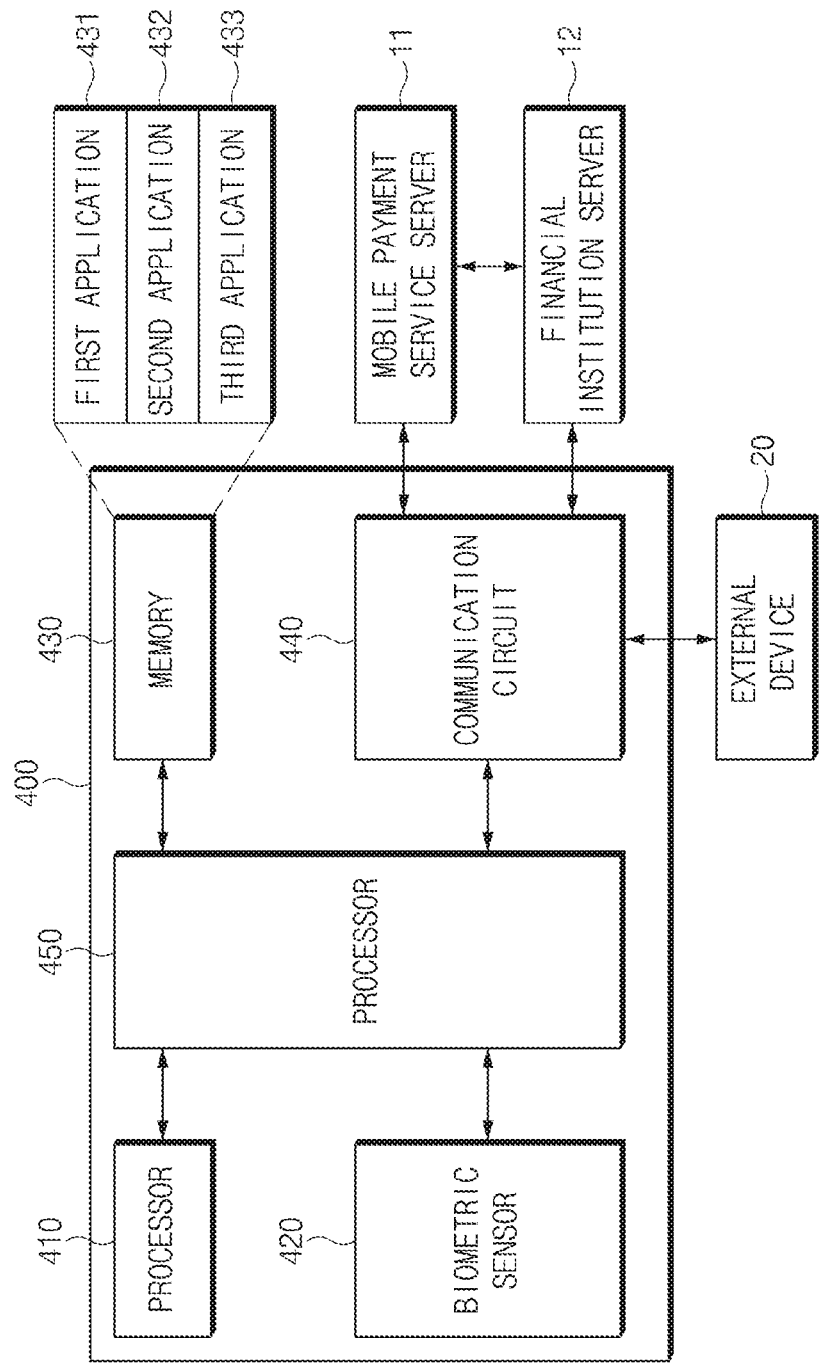
FIG. 4 illustrates a block diagram of a configuration of an electronic device according to an embodiment.

FIG. 4 illustrates a block diagram of a configuration of an electronic device according to an embodiment.

Referring to FIG. 4, an electronic device 400 according to an embodiment may include a display 410, a biometric sensor 420, a memory 430, a communication circuit 440, and a processor 450. The electronic device 400 may be one of various devices, such as a desktop computer, a laptop computer, a smartphone, a tablet PC, a wearable device, and the like.

The display 410 may output an image. The display 410 may also output a user interface. For example, the display 410 may output user interfaces of various applications executed on the electronic device 400.

The biometric sensor 420 may sense biometric information. For example, the biometric sensor 420 may sense at least some of various pieces of biometric information, such as a fingerprint, an iris, a face, and the like. The electronic device 400 may also include two or more biometric sensors.

The memory 430 may store data. The memory 430 may include a volatile and/or non-volatile memory. The memory 430 may store, for example, a first application 431, a second application 432, and a third application 433. The first application 431 may be an application for acquiring text data. The first application 431 may be an application, such as, for example, a calendar application, a messenger application, a note pad application, a social network service (SNS) application, or the like. The second application 432 may be a payment application. The second application 432 may be an application for providing mobile financial services, such as, for example, remittance, inquiry, payment, and/or the like. For example, the second application 432 may be an application, such as Samsung Pay, for providing a mobile payment service. The third application 433, which is provided by a financial institution (such as a bank), may be an application for providing a financial service.

The communication circuit 440 may communicate with a mobile payment service server 11. The communication circuit 440 may communicate with a financial institution server 12. The communication circuit 440 may communicate with an external device 20 (e.g., another user's mobile device). A server herein may mean the mobile payment service server 11 or the financial institution server 12. For example, the communication circuit 440 may perform communication by various communication methods, such as mobile communication (e.g., 3rd generation (3G), long term evolution (LTE), or the like), short range communication (e.g., Wi-Fi), and the like.

The processor 450 may be electrically connected with the display 410, the biometric sensor 420, the memory 430, and the communication circuit 440. The processor 450 may control the display 410, the biometric sensor 420, the memory 430, and the communication circuit 440. The processor 450 may also execute the first application 431, the second application 432, and/or the third application 433 stored in the memory 430.

According to an embodiment, the processor 450 may execute the first application 431. After executing the first application 431, the processor 450 may obtain remittance information from the first application 431. The processor 450 may obtain the remittance information through a user interface of the first application 431. For example, the processor 450 may obtain information that a user enters into a form provided by the first application 431, as remittance information. In another example, the processor 450 may obtain remittance information by analyzing data acquired through the first application 431 (e.g., a short message service (SMS), an e-mail, or the like). In another example, the processor 450 may obtain remittance information by analyzing a file attached to an e-mail. In another example, the processor 450 may obtain remittance information by converting handwritten data acquired through the first application 431 into text data and analyzing the converted text data.

According to an embodiment, the remittance information may include time information that represents a scheduled time to perform remittance. For example, the remittance information may include information about at least some of a title, a recipient bank, a recipient account number, a payment means, a remittance, a remittance time, a remittance period, a notification method, and pre-authorization.

The remittance information may be, for example, a ticket of a key: Value structure. The remittance information may be recorded in a javascript object notation (JSON) format.

TABLE 1

{
TICKET_LABEL : "CAR TEX",
DEEPLINK :
"samsungpay://com.samsung.android.samsungpay/scheduled_payment",
PAYMENT_INFO : [
PAYMENT_METHOD : "DEBIT_CARD_2",
PAYMENT_ID : "WOORIBANK:747-1747-4624",
AMOUNT : "47857",
DATE : "2016-06-20 PM 09:00 GMT"
]
PERIOD : "1M",
DESCRIPTION : "Monthly Payment For My car",
ALARM_TYPE : "SOUND|NOTI"
}

Table 1 shows an illustrative ticket generated in the electronic device 400 according to an embodiment. Here, TICKET_LABEL may be the title of the ticket provided to the user. DEEP_LINK may be a command to execute a specific function of the second application 432. PAYMENT_INFO may include PAYMENT_METHOD, PAYMENT_ID, AMOUNT, and DATE, which are essential remittance information. PAYMENT_METHOD may be one of a plurality of payment means registered in the second application 432. PAYMENT_ID may be a recipient bank and a recipient account number. AMOUNT may be a remittance. DATE may be a remittance time. PERIOD may be a remittance period. DESCRIPTION may be a description of the ticket. ALARM_TYPE may be a method for notifying the user that the remittance time arrives.

According to an embodiment, the processor 450 may set the time information to an automatically-specified time. For example, in the case where the user of the electronic device 400 requires immediate remittance, the processor 450 may set a remittance time to a specified time (e.g., five seconds) from the current time. The processor 450 may perform authentication and remittance processes after the specified time has elapsed.

According to an embodiment, the processor 450, when obtaining the remittance information, may provide the remittance information to the second application 432. For example, if time corresponding to the time information arrives, the processor 450 may provide the remittance information obtained through the first application 431 to the second application 432. In another example, the processor 450, when obtaining the remittance information through the first application 431, may immediately provide the remittance information to the second application 432.

According to an embodiment, if the time corresponding to the time information arrives, the processor 450 may authenticate the user of the electronic device 400 based on biometric information obtained by the biometric sensor 420 by using the second application 432. For example, the processor 450 may execute the second application 432 if the time corresponding to the time information arrives. The processor 450 may output a notification by using the display 410, a speaker (e.g., the speaker 282 of FIG. 2), and/or a motor (e.g., the motor 298 of FIG. 2) if the time corresponding to the time information arrives. The processor 450 may output, on the display 410, a user interface of the second application 432 to induce the user to input biometric information. The processor 450 may obtain biometric information about a finger print, an iris, and/or a face from the user by using the biometric sensor 420. The processor 450 may compare the obtained biometric information with biometric information stored in the memory 430. If the obtained biometric information is identical to the stored biometric information, the processor 450 may authenticate the user.

According to an embodiment, the processor 450 may obtain additional remittance information through the user interface of the second application 432 if the time corresponding to the time information arrives. In the case where there is omitted information in the obtained remittance information, the processor 450 may output a user interface for obtaining the omitted information if the time corresponding to the time information arrives. For example, in the case where the remittance information does not include information about a payment means, the processor 450 may output a user interface for obtaining the information about the payment means if the remittance time arrives. The processor 450 may obtain the information about the payment means, as additional remittance information, through the user interface of the second application 432.

According to an embodiment, in the case where a remittance period is included in the remittance information, the processor 450 may authenticate the user of the electronic device 400 every transmission period by using the second application 432. For example, in the case where the remittance period is a month, the processor 450 may authenticate the user of the electronic device 400 on a specified date every month by using the second application 432.

According to an embodiment, if the user of the electronic device 400 is authenticated, the processor 450 may request remittance from the mobile payment service server 11 based on at least some of the remittance information by using the communication circuit 440. For example, if the user of the electronic device 400 is authenticated, the processor 450 may send the mobile payment service server 11 some of the remittance information, such as a recipient bank, a recipient account number, a payment means, a remittance, and the like, by using the communication circuit 440. The processor 450 may request the mobile payment service server 11 to perform remittance based on the remittance information sent thereto by using the communication circuit 440. The remittance request may be performed by the second application 432. The mobile payment service server 11, if requested to perform the remittance, may request the remittance from the financial institution server 12. The financial institution server 12 may perform the remittance and may send a result to the mobile payment service server 11. The mobile payment service server 11 may forward the result to the electronic device 400. The processor 450 may receive the result from the mobile payment service server 11 and may output the received result on the display 410.

According to an embodiment, if the user of the electronic device 400 is authenticated, the processor 450 may request remittance from the financial institution server 12 based on at least some of the remittance information by using the communication circuit 440. For example, the remittance request may be sent from the second application 432 to the financial institution server 12 through the third application 433. In another example, the remittance request may also be directly sent from the second application 432 to the financial institution server 12.

According to an embodiment, the processor 450, when obtaining the remittance information, may authenticate the user of the electronic device 400 based on biometric information obtained by the biometric sensor 420 by using the second application 432. For example, in the case where the user has requested pre-authorization, the processor 450 may authenticate the user of the electronic device 400 by using the second application 432 immediately after obtaining the remittance information. In this case, if the time corresponding to the time information arrives, the processor 450 may request remittance from the mobile payment service server 11 or the financial institution server 12 based on at least some of the remittance information by using the communication circuit 440 without an authentication procedure.

According to an embodiment, if the user of the electronic device 400 is not authenticated for a specified period of time after the time corresponding to the time information arrives, the processor 450 may request remittance from the mobile payment service server 11 or the financial institution server 12 based on at least some of the remittance information by using the communication circuit 440. For example, in the case where remittance must necessarily be performed at a scheduled time, the user of the electronic device 400 may select a forced remittance mode when entering remittance information. In the case where the forced remittance mode is selected, the processor 450 may omit authentication of the user and may forcibly perform remittance if the user of the electronic device 400 is not authenticated for a specified period of time after a scheduled time arrives. In this case, the processor 450 may perform pre-authorization when obtaining the remittance information.

According to an embodiment, the first application 431 and the second application 432 may be integrated with each other. In this case, the processor 450 may obtain remittance information by using the second application 432, may authenticate the user of the electronic device 400 based on biometric information obtained by the biometric sensor 420 if a scheduled time arrives, and may request remittance from the mobile payment service server 11 or the financial institution server 12 based on at least some of the remittance information by using the communication circuit 440.

Figure 5:
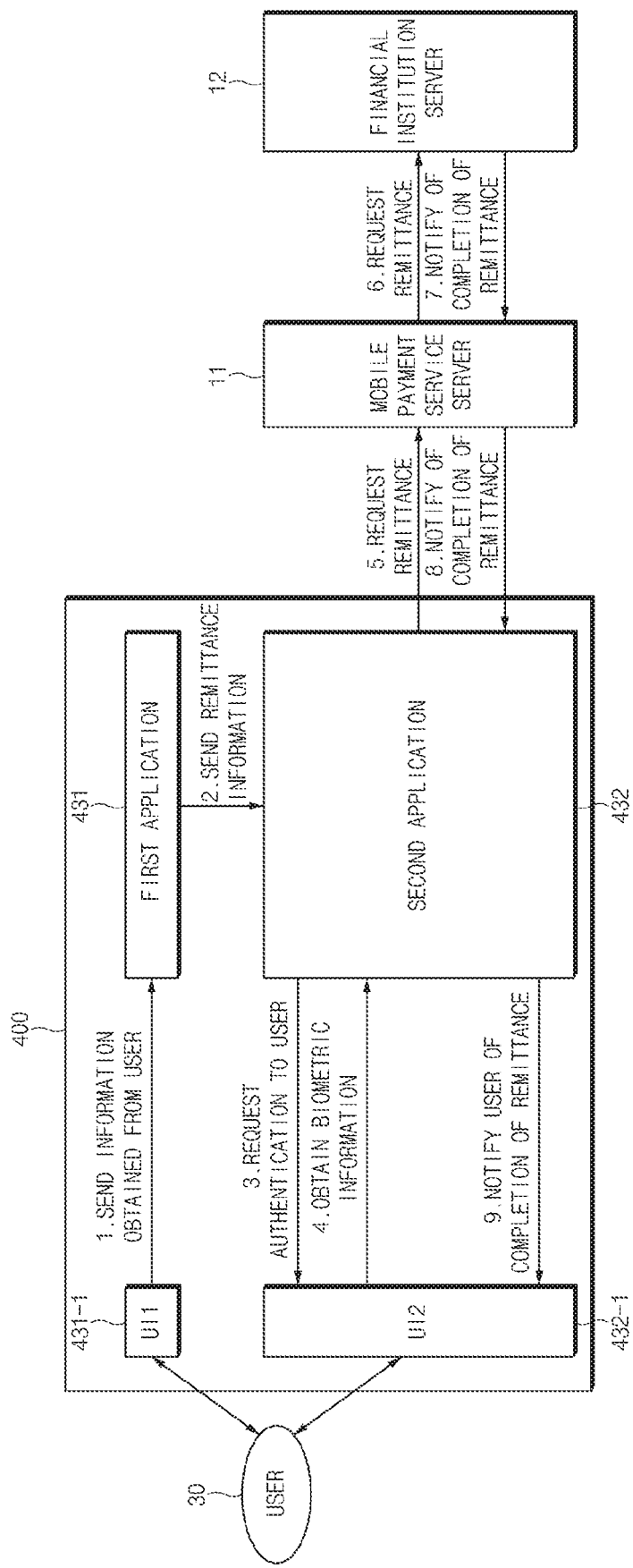
FIG. 5 illustrates a block diagram of a program module stored in an electronic device according to an embodiment.

FIG. 5 illustrates a block diagram of a program module stored in an electronic device according to an embodiment.

Referring to FIG. 5, the electronic device 400 according to an embodiment may execute the first application 431 and the second application 432 and may provide a first user interface 431-1 and a second user interface 432-1. It may be understood that operations mentioned as being performed by the electronic device 400 in the description of FIG. 5 are controlled by the processor 450 of the electronic device 400.

According to an embodiment, the electronic device 400 may output the first user interface 431-1. The first user interface 431-1 may be a user interface of the first application 431. The first user interface 431-1 may be a user interface into which a user 30 enters remittance information.

The first application 431 may obtain information from the user 30 through the first user interface 431-1. The first application 431 may generate remittance information based on the obtained information.

According to an embodiment, the first application 431 may send the remittance information to the second application 432. For example, the first application 431 may immediately send the remittance information to the second application 432 when the remittance information is generated. In another example, the first application 431 may send the remittance information to the second application 432 if a scheduled time included in the remittance information arrives.

According to an embodiment, if the scheduled time arrives, the second application 432 may request authentication from the user 30 through the second user interface 432-1. The second user interface 432-1 may be a user interface of the second application 432. The second user interface 432-1 may be a user interface for inducing the user 30 to input biometric information for authentication. The second application 432 may obtain biometric information through the second user interface 432-1. The second application 432 may perform authentication by using the obtained biometric information.

According to an embodiment, if the authentication is completed, the second application 432 may request remittance from the mobile payment service server 11. The second application 432 may request the remittance from the mobile payment service server 11 by a preset method (e.g., a method discussed with a financial institution in advance). The second application 432 may send some of the remittance information to the mobile payment service server 11 and may request the remittance from the mobile payment service server 11. The mobile payment service server 11 may request the remittance from the financial institution server 12. If the remittance is completed in the financial institution server 12, the financial institution server 12 may send the mobile payment service server 11 a notification of the completion of the remittance. The mobile payment service server 11 may send the second application 432 the notification of the completion of the remittance. The second application 432 may receive the notification of the completion of the remittance from the mobile payment service server 11. If the completion of the remittance is verified, the second application 432 may notify the user 30 of the completion of the remittance through the second user interface 432-1.

While FIG. 5 illustrates that the first application 431 and the second application 432 are separately implemented, the present disclosure is not limited thereto, and the first application 431 and the second application 432 may be integrated with each other.

Furthermore, while FIG. 5 illustrates that the second application 432 requests remittance from the mobile payment service server 11, the present disclosure is not limited thereto, and the second application 432 may also request remittance from the financial institution server 12. In addition, the second application 432 may also request remittance from the financial institution server 12 through a third application (e.g., the third application 433 of FIG. 4).

Hereinafter, an illustrative operation of obtaining remittance information by an electronic device according to an embodiment will be described with reference to FIGS. 6 to 8.

Figure 6:
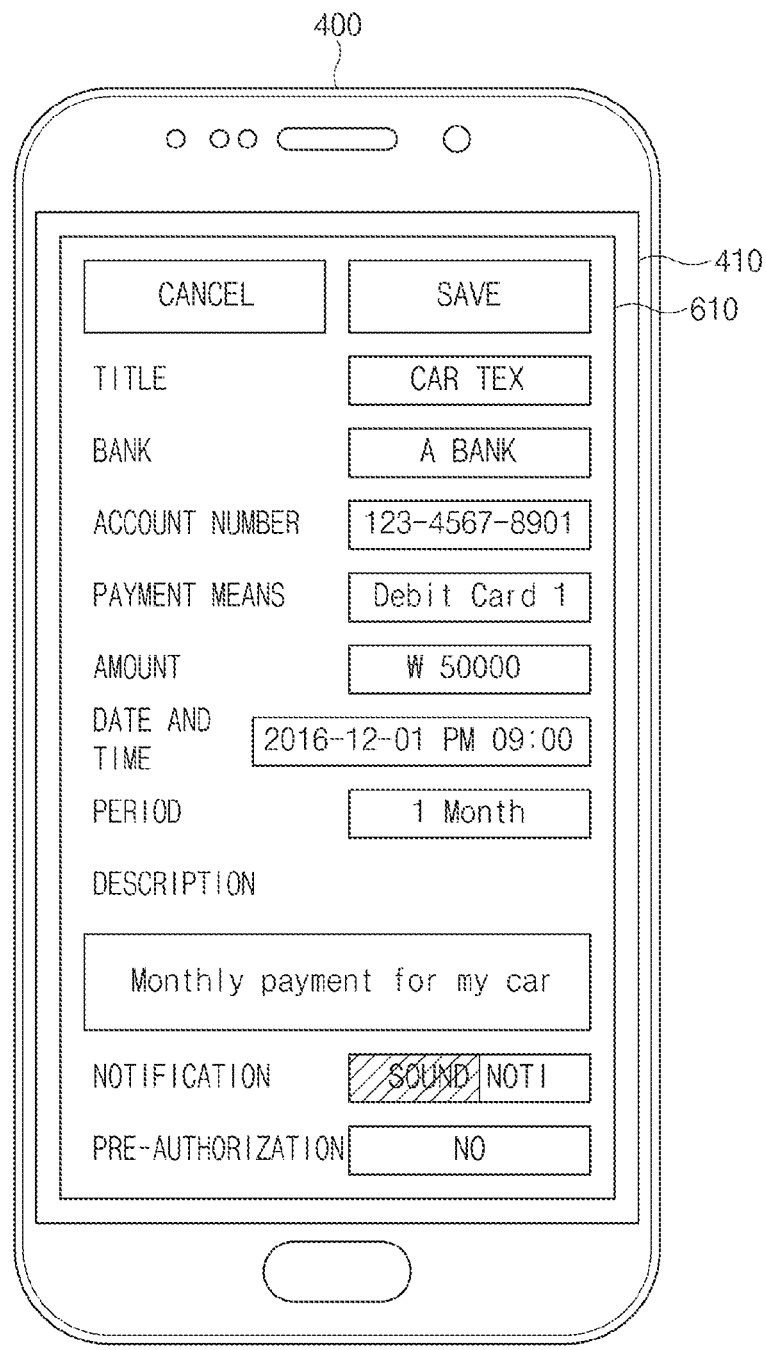
FIG. 6 illustrates an illustrative user interface displayed on an electronic device according to an embodiment, the user interface being associated with generating remittance information.

FIG. 6 illustrates an illustrative user interface displayed on an electronic device according to an embodiment, the user interface being associated with generating remittance information.

According to an embodiment, the electronic device 400 may obtain remittance information through a user interface of the first application 431. It may be understood that operations mentioned as being performed by the electronic device 400 in the description of FIG. 6 are controlled by the processor 450 of the electronic device 400.

Referring to FIG. 6, the electronic device 400 according to an embodiment may display, on the display 410, an input window 610 that is a user interface of the first application 431. The first application 431 may be, for example, a calendar application. The input window 610 may include a form through which to receive remittance information from a user. For example, the input window 610 may include fields available for a title, a recipient bank, a recipient account number, a payment means, an amount of money, a date and time, a period, a description, a notification method, pre-authorization, and the like. The user may enter data in each field included in the input window 610, and the electronic device 400 may acquire the entered data. The electronic device 400 may generate remittance information based on the acquired data. The remittance information may include, for example, Title "CAR TEX", Recipient Bank "A BANK", Recipient Account Number "123-4567-8901", Payment Means "Debit Card 1", Amount "₩ 50000", Date and Time "2016-12-01 PM 09:00", Period "1 Month", Description "Monthly payment for my car", Notification Type "SOUND", Pre-authorization "NO", and the like.

Figure 7:
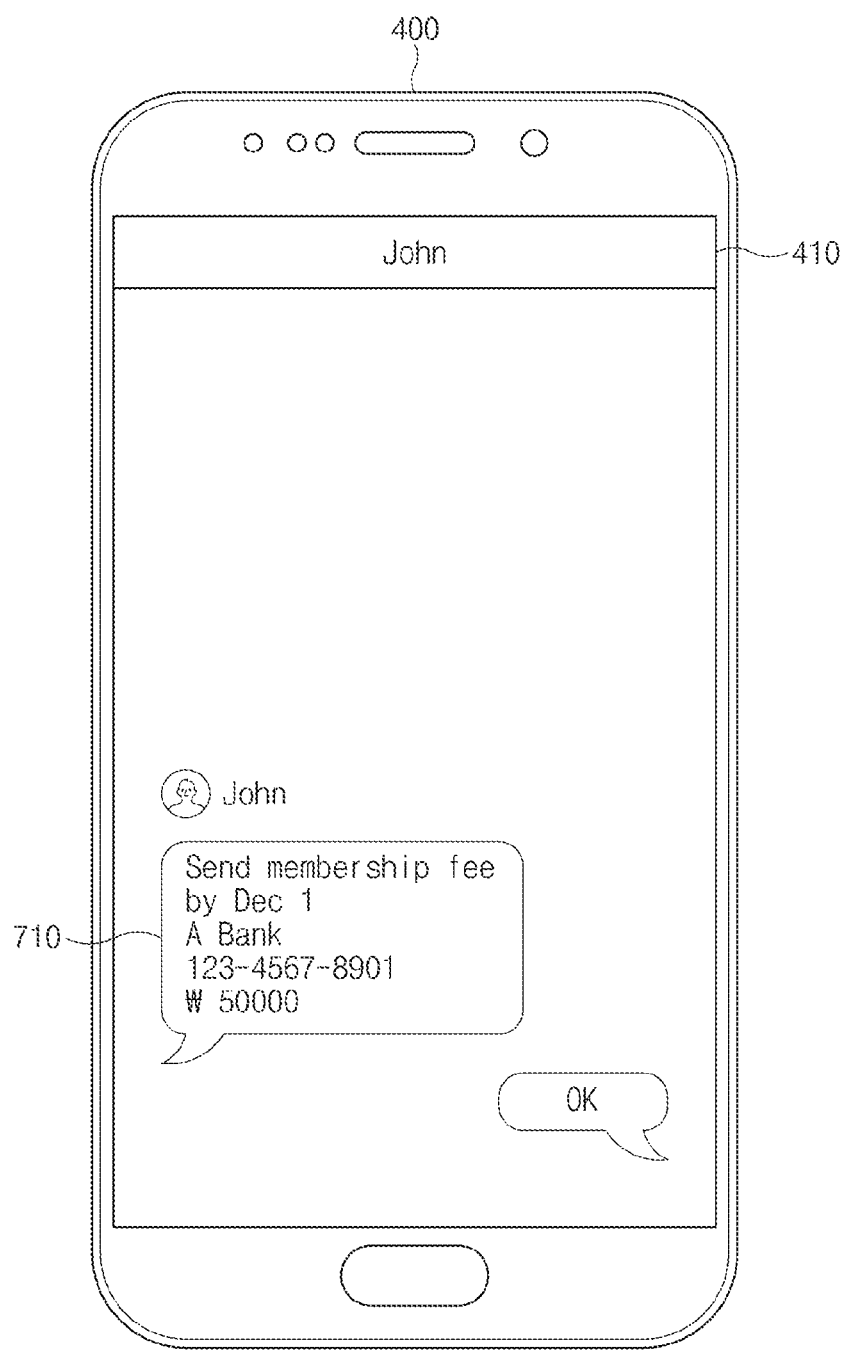
FIG. 7 illustrates an illustrative user interface displayed on an electronic device according to an embodiment, the user interface being associated with generating remittance information.

FIG. 7 illustrates an illustrative user interface displayed on an electronic device according to an embodiment, the user interface being associated with generating remittance information.

According to an embodiment, the electronic device 400 may obtain remittance information by analyzing text data acquired through the first application 431. It may be understood that operations mentioned as being performed by the electronic device 400 in the description of FIG. 7 are controlled by the processor 450 of the electronic device 400.

Referring to FIG. 7, the electronic device 400 according to an embodiment may display a user interface of the first application 431 on the display 410. The first application 431 may be, for example, a messenger application. The electronic device 400 may receive a message 710 through the first application 431. The electronic device 400 may analyze text data included in the message 710. The electronic device 400 may obtain remittance information by analyzing the text data included in the message 710. The electronic device 400 may obtain information, which may be, for example, a title, a remittance time, a recipient bank, a recipient account number, a remittance, and the like by analyzing the message 710. For example, the electronic device 400 may automatically obtain remittance information, including Title "membership fee", Remittance Time "December 01", Recipient Bank "A BANK", Recipient Account Number "123-4567-8901", Remittance "₩ 50000", and the like.

FIG. 7 illustrates that the electronic device 400 obtains the remittance information by analyzing the message 710. Without being limited thereto, however, the electronic device 400 may obtain remittance information by analyzing an e-mail or may obtain remittance information by analyzing a file attached to an e-mail or a message.

Figure 8:
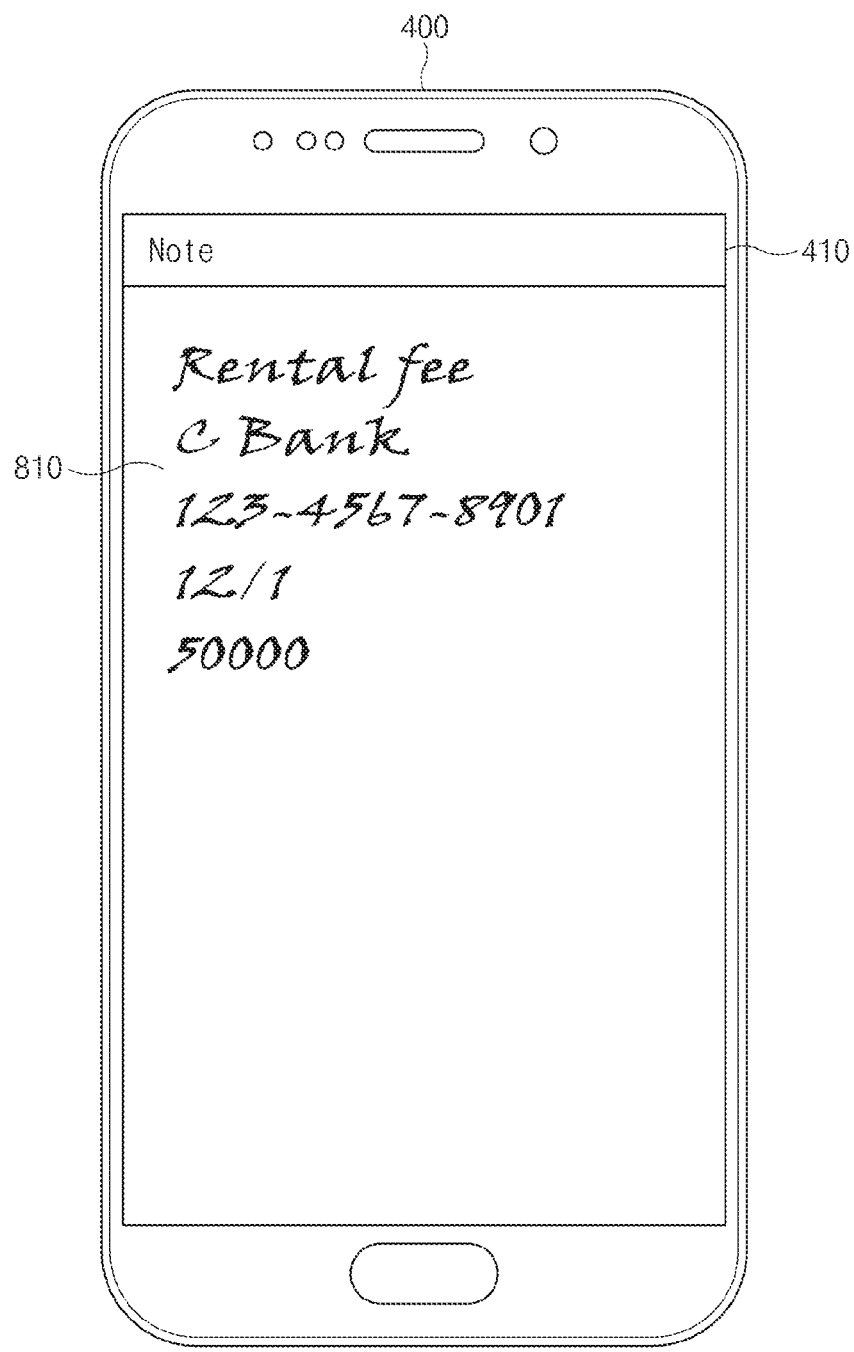
FIG. 8 illustrates an illustrative user interface displayed on an electronic device according to an embodiment, the user interface being associated with generating remittance information.

FIG. 8 illustrates an illustrative user interface displayed on an electronic device according to an embodiment, the user interface being associated with generating remittance information.

According to an embodiment, the electronic device 400 may obtain remittance information by acquiring handwritten data through the first application 431 and analyzing text data acquired based on the handwritten data. It may be understood that operations mentioned as being performed by the electronic device 400 in the description of FIG. 8 are controlled by the processor 450 of the electronic device 400.

Referring to FIG. 8, the electronic device 400 according to an embodiment may display a user interface of the first application 431 on the display 410. The first application 431 may be, for example, a note pad application. The electronic device 400 may acquire handwritten data generated by a user's touch input through an input window 810. The electronic device 400 may acquire text data from the handwritten data by analyzing the handwritten data input through the input window 810. The electronic device 400 may obtain remittance information by analyzing the text data. The electronic device 400 may obtain information, which may be, for example, a title, a recipient bank, a recipient account number, a remittance time, a remittance, and the like. For example, the electronic device 400 may automatically obtain remittance information, including Title "Rental fee", Recipient Bank "C BANK", Recipient Account Number "123-4567-8901", Remittance Time "December 01", Remittance "₩ 50000", and the like.

Hereinafter, an illustrative operation in which an electronic device according to an embodiment authenticates a user of the electronic device will be described with reference to FIGS. 9 to 12.

Figure 9:
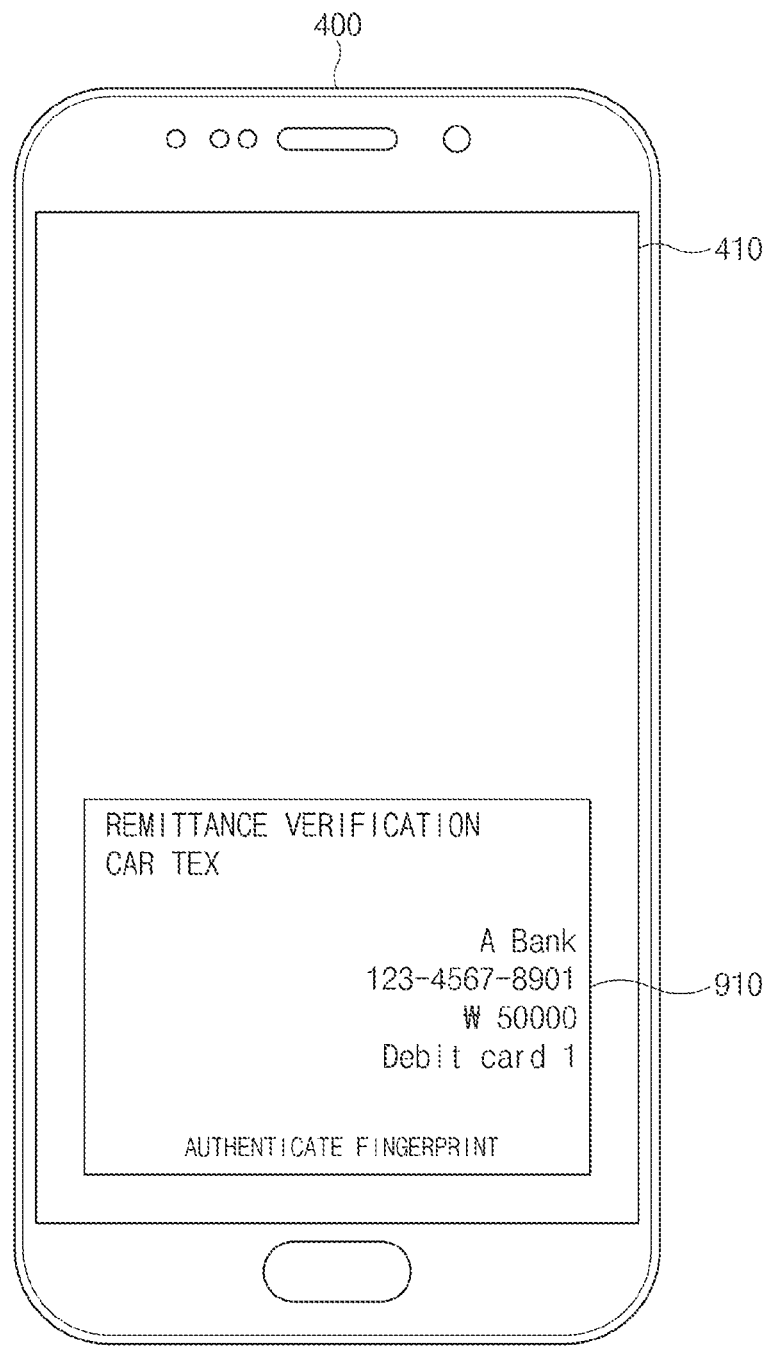
FIG. 9 illustrates an illustrative user interface displayed on an electronic device according to an embodiment, the user interface being associated with user authentication.

FIG. 9 illustrates an illustrative user interface displayed on an electronic device according to an embodiment, the user interface being associated with user authentication.

According to an embodiment, the electronic device 400 may authenticate a user by using the second application 432 if a scheduled time arrives. It may be understood that operations mentioned as being performed by the electronic device 400 in the description of FIG. 9 are controlled by the processor 450 of the electronic device 400.

Referring to FIG. 9, the electronic device 400 according to an embodiment may execute the second application 432 if the scheduled time arrives. The electronic device 400 may display a user interface 910 of the second application 432 on the display 410 to induce authentication of the user. The electronic device 400 may display, on the user interface 910, information about, for example, a title, a recipient bank, a recipient account number, a remittance, and a payment means included in remittance information. The electronic device 400 may display, on the user interface 910, a message to induce the user to input a fingerprint. The user may input a fingerprint to a biometric sensor after checking the displayed information and message. If a fingerprint is input by the user, the electronic device 400 may perform authentication by comparing the input fingerprint with a fingerprint stored in advance. If the authentication is completed, the electronic device 400 may request remittance.

Figure 10:
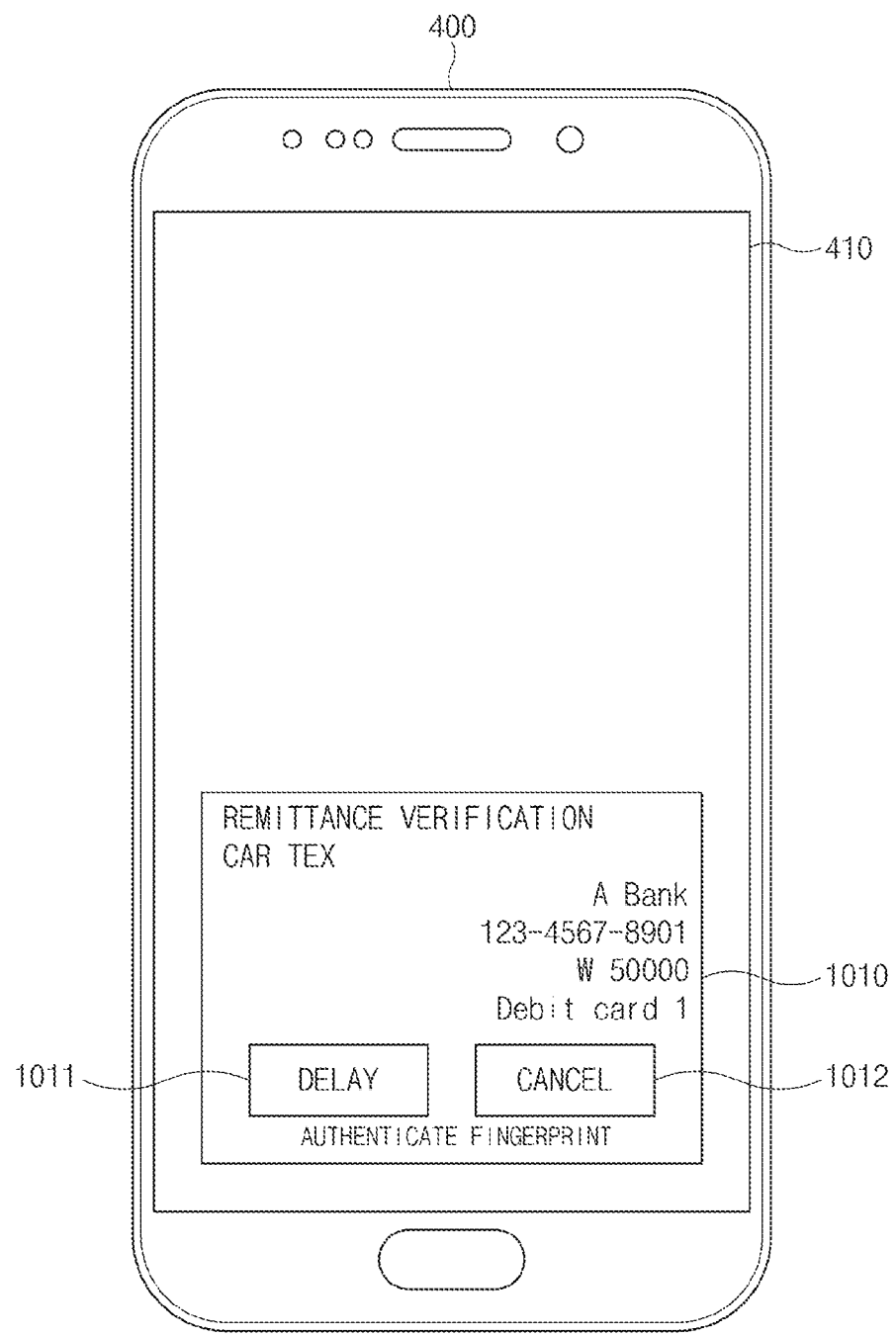
FIG. 10 illustrates an illustrative user interface displayed on an electronic device according to an embodiment, the user interface being associated with a remittance operation.

FIG. 10 illustrates an illustrative user interface displayed on an electronic device according to an embodiment, the user interface being associated with a remittance operation.

According to an embodiment, if a scheduled time arrives, the electronic device 400 may output a user interface including an option for delaying remittance and/or a user interface including an option for cancelling remittance. It may be understood that operations mentioned as being performed by the electronic device 400 in the description of FIG. 10 are controlled by the processor 450 of the electronic device 400.

Referring to FIG. 10, the electronic device 400 according to an embodiment may execute the second application 432 if the scheduled time arrives. The electronic device 400 may display a user interface 1010 of the second application 432 on the display 410 to induce authentication of a user. The electronic device 400 may display, on the user interface 1010, information about, for example, a title, a recipient bank, a recipient account number, a remittance, and a payment means included in remittance information. The electronic device 400 may display, on the user interface 1010, a message to induce the user to input a fingerprint.

According to an embodiment, the electronic device 400 may display a remittance delay button 1011 for delaying remittance on the user interface 1010. If the user's input is applied to the remittance delay button 1011, the electronic device 400 may postpone time to perform remittance. The electronic device 400 may display a remittance cancel button 1012 for cancelling remittance on the user interface 1010. If the user's input is applied to the remittance cancel button 1012, the electronic device 400 may cancel remittance.

Figure 11:
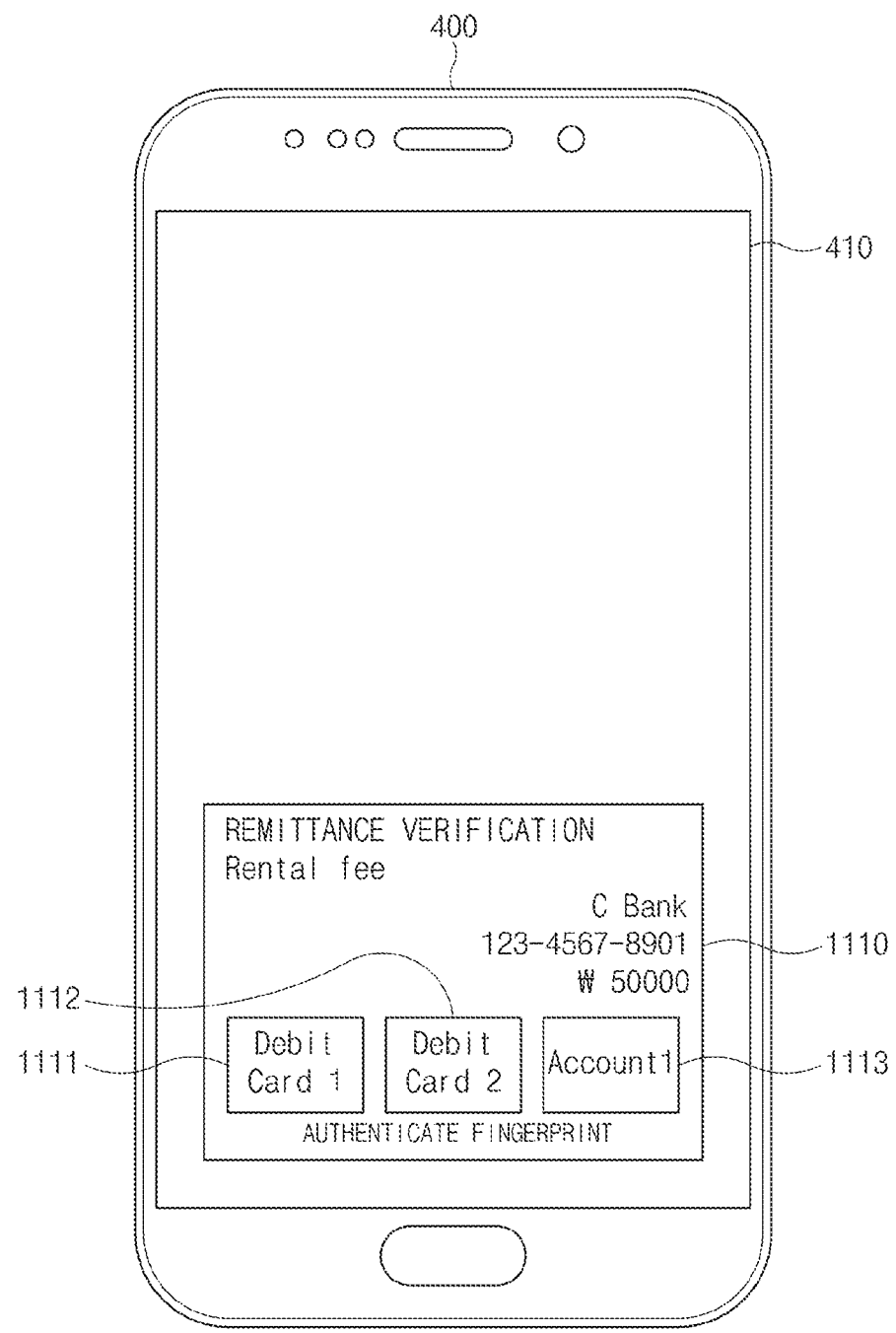
FIG. 11 illustrates an illustrative user interface displayed on an electronic device according to an embodiment, the user interface being associated with a remittance operation.

FIG. 11 illustrates an illustrative user interface displayed on an electronic device according to an embodiment, the user interface being associated with a remittance operation.

According to an embodiment, if a scheduled time arrives, the electronic device 400 may obtain additional remittance information through a user interface of the second application 432. For example, the electronic device 400 may select one or more payment means through the user interface of the second application 432. It may be understood that operations mentioned as being performed by the electronic device 400 in the description of FIG. 11 are controlled by the processor 450 of the electronic device 400.

Referring to FIG. 11, the electronic device 400 according to an embodiment may execute the second application 432 if the scheduled time arrives. The electronic device 400 may display a user interface 1110 of the second application 432 on the display 410 to induce authentication of a user. The electronic device 400 may display, on the user interface 1110, information about, for example, a title, a recipient bank, a recipient account number, and a remittance included in remittance information. The electronic device 400 may display, on the user interface 1110, a message to induce the user to input a fingerprint.

According to an embodiment, the electronic device 400 may display buttons 1111, 1112, and 1113 for selecting a payment means on the user interface 1110. For example, the electronic device 400 may display, on the user interface 1110, the first button 1111 for selecting "Debit Card 1", the second button 1112 for selecting "Debit Card 2", and the third button 1113 for selecting "Account 1". The electronic device 400 may receive the user's input for one or more of the first button 1111, the second button 1112, and the third button 1113. If the user's input is applied to the first button 1111, the second button 1112, and/or the third button 1113, the electronic device 400 may select a payment means corresponding to the button to which the input is applied. If user authentication is completed, the electronic device 400 may request remittance by using the selected payment means.

Figure 12:
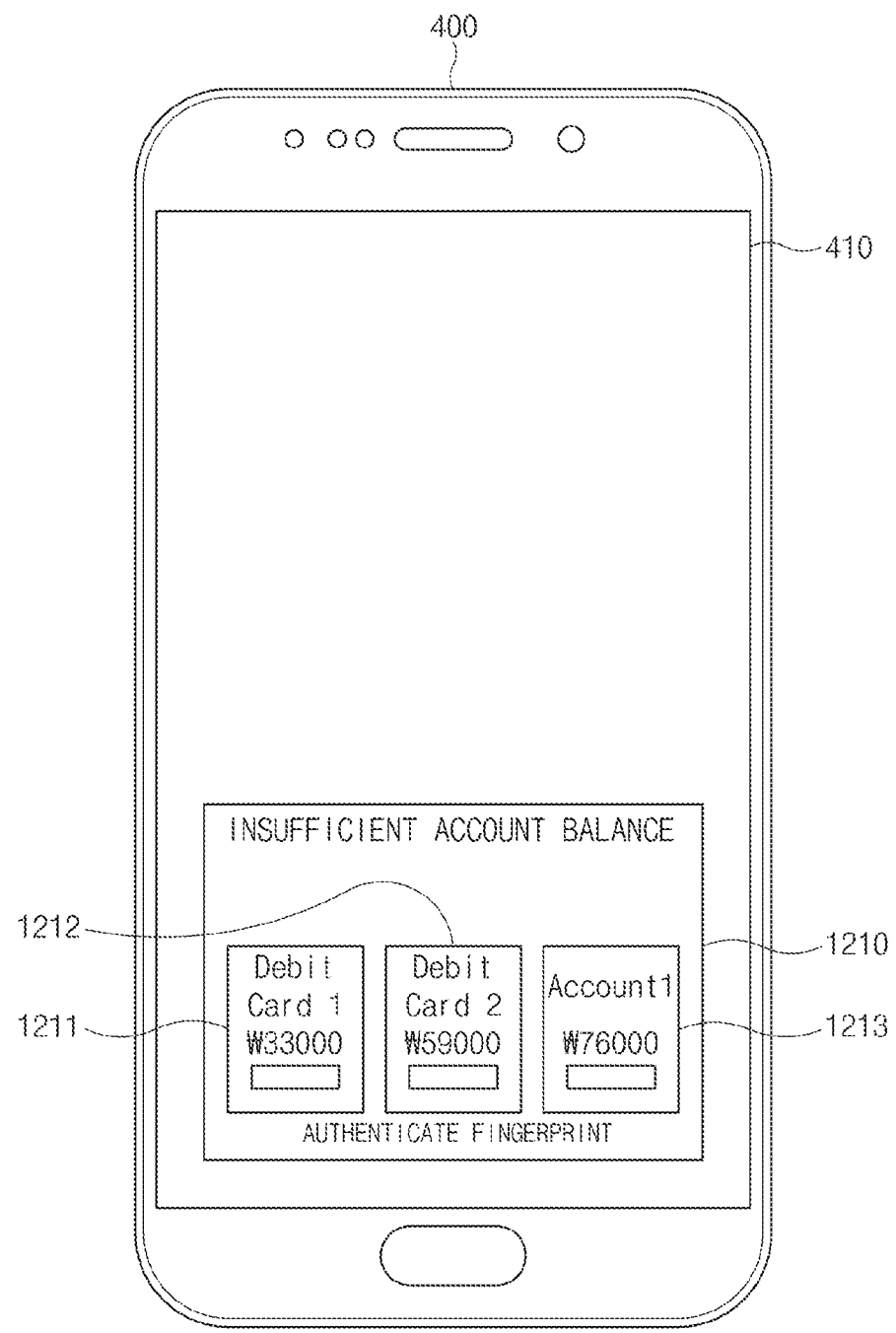
FIG. 12 illustrates an illustrative user interface displayed on an electronic device according to an embodiment, the user interface being associated with a remittance operation.

FIG. 12 illustrates an illustrative user interface displayed on an electronic device according to an embodiment, the user interface being associated with a remittance operation.

According to an embodiment, in the case where a payment means included in remittance information has an insufficient account balance, the electronic device 400 may select one or more other payment means through the second application 432. According to an embodiment, in the case where the payment means included in the remittance information has an insufficient account balance, the electronic device 400 may select, through the second application 432, a plurality of payment means that include the payment means included in the remittance information. It may be understood that operations mentioned as being performed by the electronic device 400 in the description of FIG. 12 are controlled by the processor 450 of the electronic device 400.

Referring to FIG. 12, the electronic device 400 according to an embodiment may perform remittance based on the remittance information. In the case where the account balance of the payment means included in the remittance information is lower than a remittance, the electronic device 400 may display a user interface 1210 of the second application 432 that notifies of the insufficient account balance.

According to an embodiment, the electronic device 400 may display, on the user interface 1210, buttons 1211, 1212, and 1213 for displaying the account balance of a payment means. The first button 1211 may display the account balance of "Debit Card 1" and an input window for entering an amount of money to be remitted from "Debit Card 1". The second button 1212 may display the account balance of "Debit Card 2" and an input window for entering an amount of money to be remitted from "Debit Card 2". The third button 1213 may display the account balance of "Account 1" and an input window for entering an amount of money to be remitted from "Account 1". The electronic device 400 may sense an input for the first button 1211, the second button 1212, or the third button 1213 and may make a request to remit an amount of money displayed on the selected button by using the payment means displayed on the selected button.

Hereinafter, an operation of using remittance information in an electronic device and an external device will be described with reference to FIG. 13.

Figure 13:
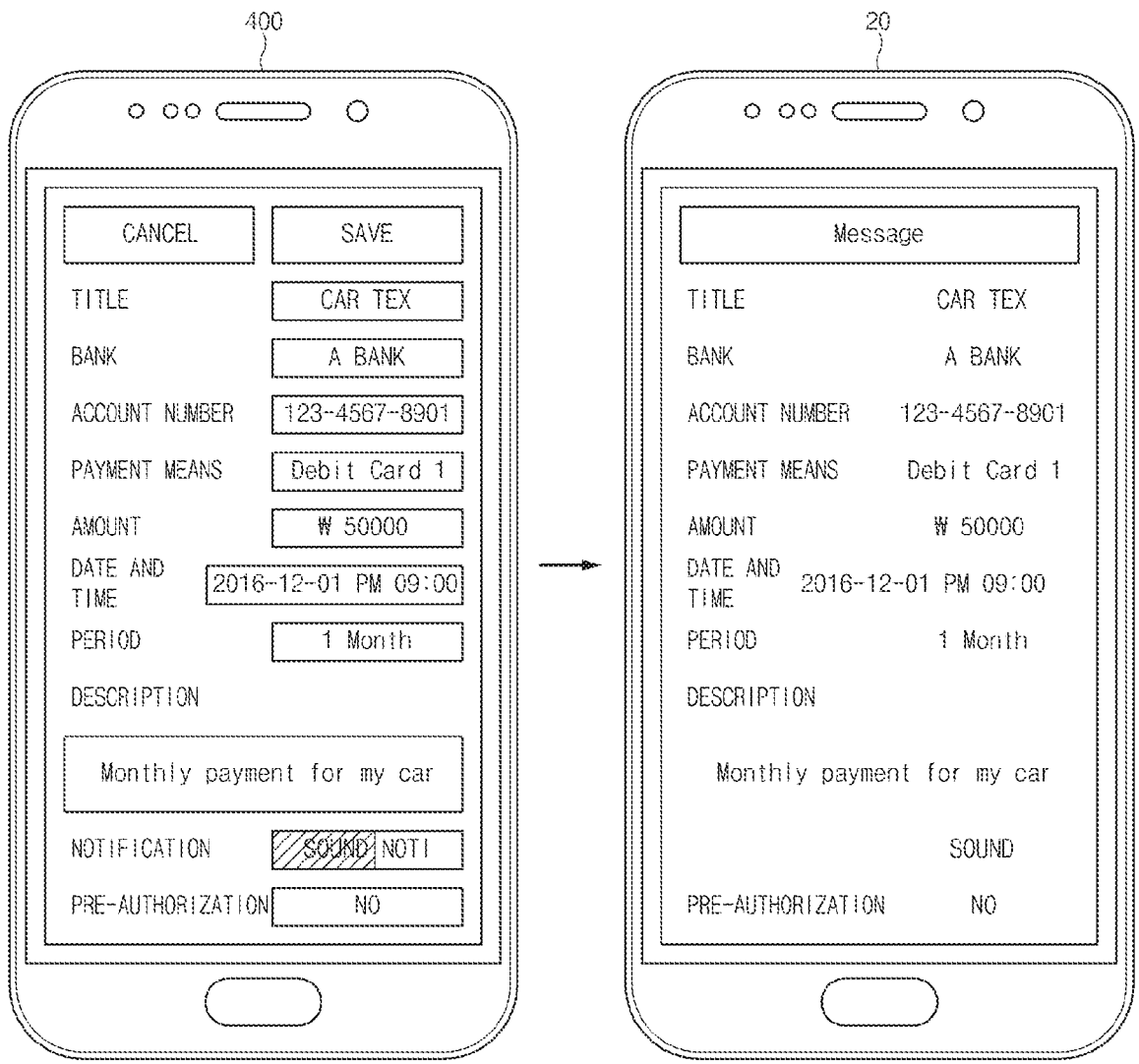
FIG. 13 illustrates an illustrative user interface displayed on an electronic device according to an embodiment, the user interface being associated with sending remittance information.

FIG. 13 illustrates an illustrative user interface displayed on an electronic device according to an embodiment, the user interface being associated with sending remittance information.

According to an embodiment, the electronic device 400 may send remittance information to the external device 20. It may be understood that operations mentioned as being performed by the electronic device 400 in the description of FIG. 13 are controlled by the processor 450 of the electronic device 400.

Referring to FIG. 13, the electronic device 400 according to an embodiment may obtain remittance information by using the first application 431. The electronic device 400 may receive data from a user through the first application 431 and may generate remittance information based on the received data.

According to an embodiment, the electronic device 400 may send the generated remittance information to the external device 20. The external device 20 may be, for example, another user's mobile device. The electronic device 400 may send the remittance information to the external device 20 by using a means, such as, for example, a message, an e-mail, or the like. The external device 20 may receive the remittance information. The external device 20 may authenticate the user if a scheduled time included in the received remittance information arrives, and may request remittance based on the remittance information if the authentication is completed.

According to an embodiment, the electronic device 400 may also receive remittance information from the external device 20. The electronic device 400 may perform a remittance operation by using the received remittance information. For example, the electronic device 400 may authenticate a user if a scheduled time included in the received remittance information arrives, and may request remittance based on the remittance information if the authentication is completed.

Hereinafter, a method performed in an electronic device according to an embodiment will be described with reference to FIGS. 14 and 15.

Figure 14:
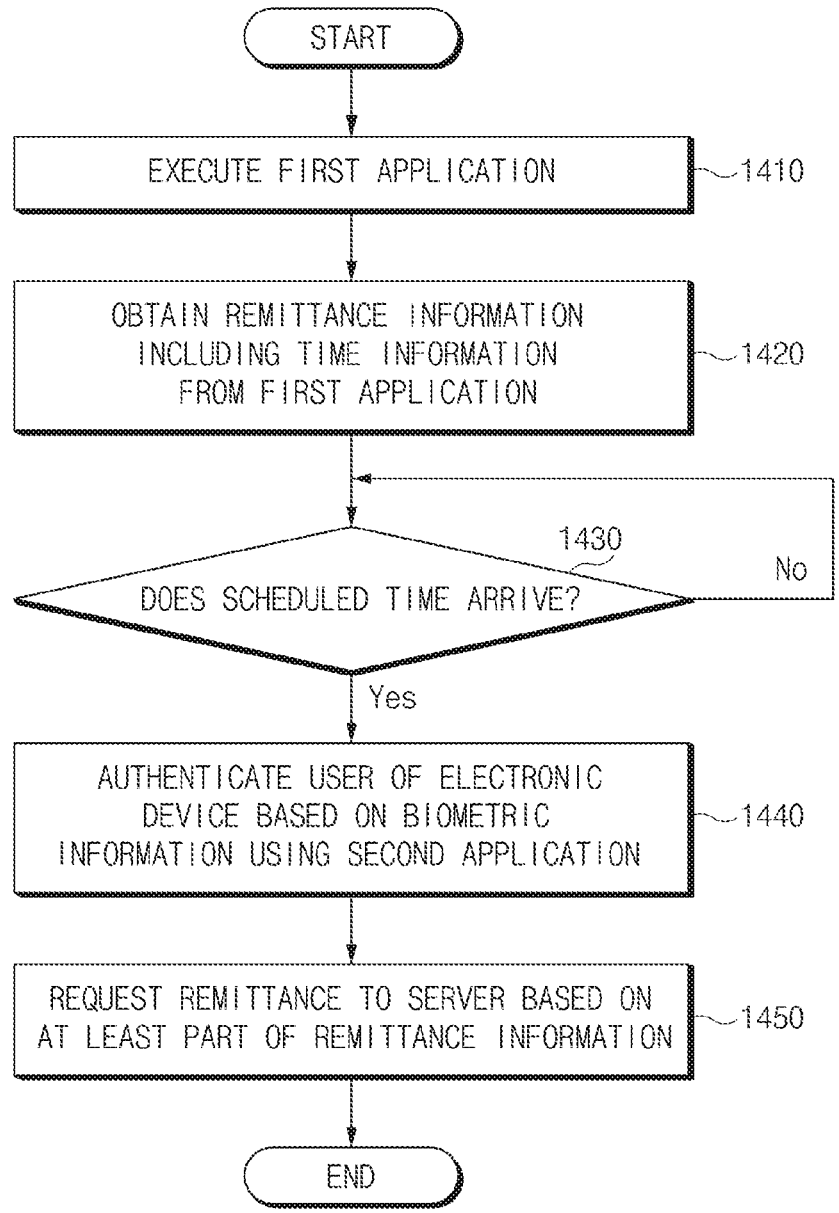
FIG. 14 illustrates a flowchart of a remittance method of an electronic device according to an embodiment.

FIG. 14 illustrates a flowchart of a remittance method of an electronic device according to an embodiment.

Hereinafter, it is assumed that the electronic device 400 of FIG. 4 performs the process illustrated in FIG. 14. Furthermore, it may be understood that operations mentioned as being performed by the electronic device 400 in the description of FIG. 14 are controlled by the processor 450 of the electronic device 400.

Referring to FIG. 14, in operation 1410, the electronic device may execute the first application 431. For example, the electronic device 400 may execute a calendar application, a messenger application, a note pad application, an SNS application, or the like.

In operation 1420, the electronic device may obtain remittance information, including time information, from a first application. For example, the electronic device may acquire data from a user through a form provided by the first application and may generate remittance information based on the acquired data. In another example, the electronic device may generate remittance information by analyzing text data acquired by the first application. In another example, the electronic device may generate remittance information by converting handwritten data acquired by the first application into text data and analyzing the text data.

In operation 1430, the electronic device may determine whether a scheduled time has arrived. For example, the electronic device may determine whether time corresponding to the time information included in the remittance information has arrived. The electronic device may perform operation 1440 if the scheduled time arrives.

In operation 1440, the electronic device may authenticate the user of the electronic device based on biometric information by using a second application. For example, the electronic device may obtain the user's fingerprint and may compare the obtained fingerprint and a fingerprint registered in advance. If the obtained fingerprint is identical to the fingerprint registered in advance, the electronic device may authenticate the user.

In operation 1450, the electronic device may request remittance from a server based on at least some of the remittance information. For example, the electronic device may send the server some of the remittance information, such as a recipient bank, a recipient account number, a payment means, a remittance, and the like, and may request remittance from the server.

Figure 15:
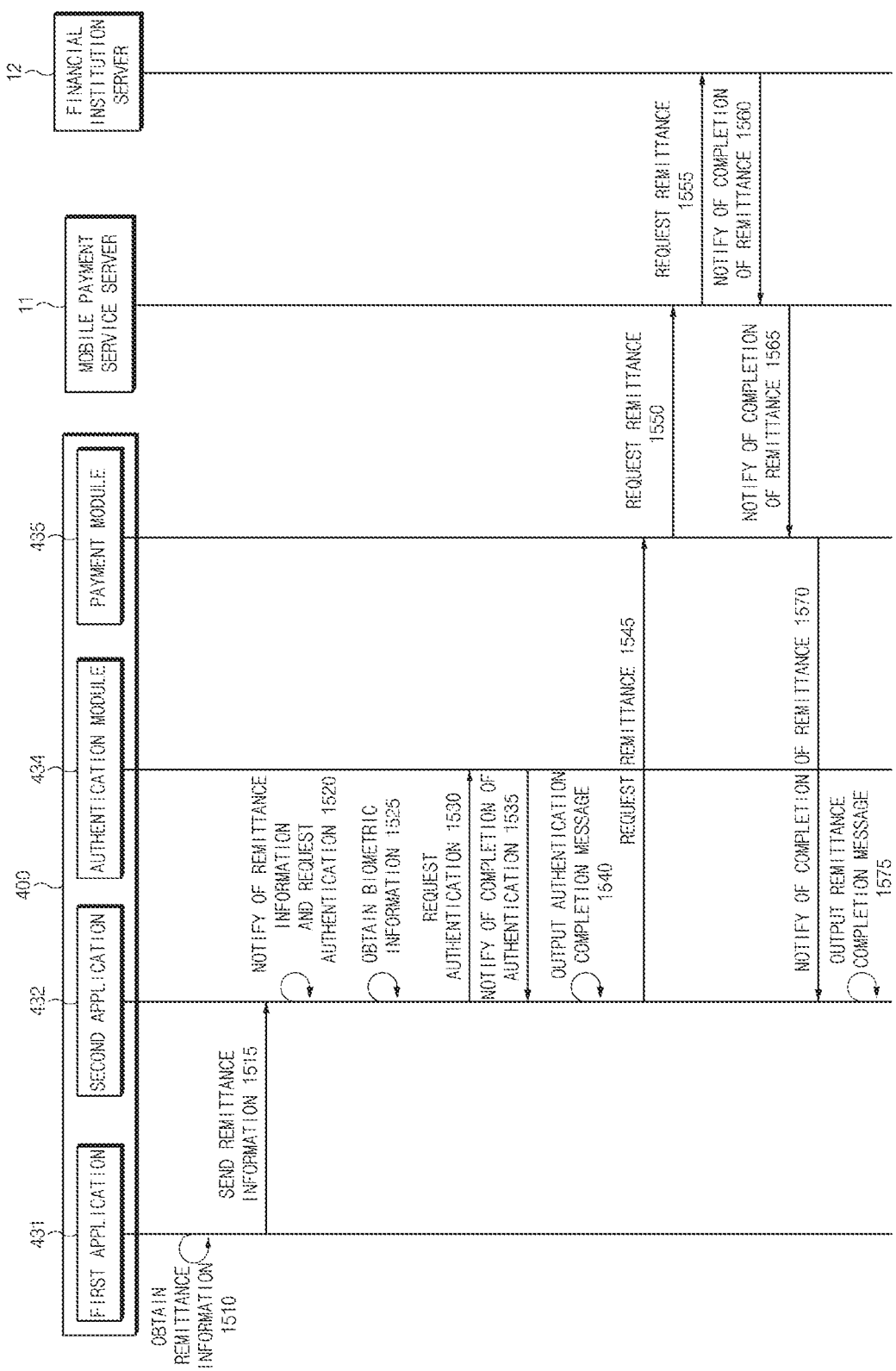
FIG. 15 illustrates a signal flow diagram of a remittance method of an electronic device according to an embodiment.

FIG. 15 illustrates a signal flow diagram of a remittance method of an electronic device according to an embodiment.

Hereinafter, it is assumed that the electronic device 400 of FIG. 4 performs the process illustrated in FIG. 15. Furthermore, it may be understood that operations mentioned as being performed by the electronic device 400 in the description of FIG. 15 are controlled by the processor 450 of the electronic device 400. The first application 431, the second application 432, an authentication module 434, and a payment module 435 illustrated in FIG. 15 may be executed by the processor 450 of the electronic device 400.

Referring to FIG. 15, in operation 1510, the first application 431 may obtain remittance information. For example, the first application 431 may receive a user input through a user interface and may obtain remittance information based on the user input.

In operation 1515, the first application 431 may send the remittance information to the second application 432. For example, the first application 431 may immediately send the remittance information to the second application 432 if the remittance information is obtained, and may send the remittance information to the second application 432 if a scheduled time arrives.

In operation 1520, the second application 432 may provide a notification of the remittance information and may request authentication from a user. For example, the second application 432 may provide the notification through a user interface if the scheduled time arrives. The second application 432 may output a message to induce the user to input biometric information.

In operation 1525, the second application 432 may obtain biometric information. For example, the second application 432 may obtain biometric information input by the user.

In operation 1530, the second application 432 may request authentication from the authentication module 434. For example, the second application 432 may send the obtained biometric information to the authentication module 434 and may request authentication of the obtained biometric information.

In operation 1535, the authentication module 434 may notify the second application 432 that the authentication is completed. For example, if the obtained biometric information is identical to biometric information registered in advance, the authentication module 434 may complete the authentication. If the authentication is completed, the authentication module 434 may notify the second application 432 that the authentication is completed.

In operation 1540, the second application 432 may output an authentication completion message. For example, the second application 432 may output the authentication completion message to notify the user that the authentication is completed.

In operation 1545, the second application 432 may request remittance from the payment module 435. For example, the second application 432 may send the payment module 435 some of the remittance information, such as a recipient bank, a recipient account number, a payment means, a remittance, and the like, and may request remittance from the payment module 435.

In operation 1550, the payment module 435 may request the remittance from the mobile payment service server 11. For example, the payment module 435 may send the mobile payment service server 11 some of the remittance information, such as the recipient bank, the recipient account number, the payment means, the remittance, and the like, and may request the remittance from the mobile payment service server 11.

In operation 1555, the mobile payment service server 11 may request the remittance from the financial institution server 12. For example, the mobile payment service server 11 may send the received remittance information to the financial institution server 12, and may request the remittance from the financial institution server 12.

In operation 1560, the financial institution server 12 may notify the mobile payment service server 11 that the remittance is completed. For example, the financial institution server 12 may perform the remittance based on the received remittance information. If the remittance is completed, the financial institution server 12 may notify the mobile payment service server 11 that the remittance is completed.

In operation 1565, the mobile payment service server 11 may notify the payment module 435 that the remittance is completed. For example, if notified of the completion of the remittance by the financial institution server 12, the mobile payment service server 11 may notify the payment module 435 that the remittance is completed.

In operation 1570, the payment module 435 may notify the second application 432 that the remittance is completed. For example, if notified of the completion of the remittance by the mobile payment service server 11, the payment module 435 may notify the second application 432 that the remittance is completed.

In operation 1575, the second application 432 may output a remittance completion message. For example, the second application 432 may output the remittance completion message to notify the user that the remittance is completed.

The term "module" used in this disclosure may represent, for example, a unit including one or more combinations of hardware, software and firmware. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" may include at least one of an application-specific IC (ASIC) chip, a field-programmable gate array (FPGA), and a programmable-logic device for performing some operations, which are known or will be developed.

At least a part of an apparatus (e.g., modules or functions thereof) or a method (e.g., operations) according to various embodiments may be, for example, implemented by instructions stored in computer-readable storage media in the form of a program module. The instruction, when executed by a processor (e.g., the processor 120), may cause the one or more processors to perform a function corresponding to the instruction. The computer-readable storage media, for example, may be the memory 130.

A computer-readable recording medium may include a hard disk, a floppy disk, a magnetic media (e.g., a magnetic tape), an optical media (e.g., a compact disc read only memory (CD-ROM) and a digital versatile disc (DVD), a magneto-optical media (e.g., a floptical disk)), and hardware devices (e.g., a read only memory (ROM), a random access memory (RAM), or a flash memory). Also, a program instruction may include not only a mechanical code such as things generated by a compiler but also a high-level language code executable on a computer using an interpreter. The above-described hardware unit may be configured to operate via one or more software modules for performing an operation of various embodiments of the present disclosure, and vice versa.

A module or a program module according to various embodiments may include at least one of the above elements, or a part of the above elements may be omitted, or additional other elements may be further included. Operations performed by a module, a program module, or other elements according to various embodiments may be executed sequentially, in parallel, repeatedly, or in a heuristic method. In addition, some operations may be executed in different sequences or may be omitted. Alternatively, other operations may be added.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An electronic device comprising:
a display;
a communication circuit configured to communicate with a server;
a memory in which a first application for acquiring data and a second application for payment are stored;
a biometric sensor configured to sense biometric information; and
a processor electrically connected with the display, the communication circuit, the memory, and the biometric sensor,
wherein the processor is configured to:
execute the first application;
obtain remittance information including time information from the first application, wherein the time information includes a scheduled time to perform remittance;
determine that a time, corresponding to the scheduled time to perform the remittance, arrives;
authenticate, in response to the determination that the time arrives, a user of the electronic device based on the biometric information, which is obtained by the biometric sensor, using the second application;
request the remittance to the server based on at least a part of the remittance information, and based on the determination that the time arrives, using the communication circuit if the user of the electronic device is authenticated;
determine that the authentication of the user is not provided within a specified period of time after the time arrives;
select, based on determination that the authentication of the user is not provided within a specified period of time after the time arrives, a forced remittance mode in response to the determination that the authentication of the user is not provided; and
request, based on the selection of the forced remittance mode, performance of remittance while omitting user authentication.

2. The electronic device of claim 1, wherein the processor is further configured to obtain the remittance information through a first user interface of the first application.

3. The electronic device of claim 1, wherein the processor is further configured to obtain the remittance information by analyzing the data obtained by the first application.

4. The electronic device of claim 1, wherein the processor is further configured to:
obtain handwritten data using the first application; and
obtain the remittance information by analyzing text data obtained from the handwritten data.

5. The electronic device of claim 1, wherein the processor is further configured to provide the remittance information to the second application if the remittance information is obtained.

6. The electronic device of claim 1, wherein the processor is further configured to provide the remittance information to the second application if the time arrives.

7. The electronic device of claim 1, wherein the processor is further configured to obtain the remittance information including information about at least a part of a title, a recipient bank, a recipient account number, a payment means, an amount of the remittance, a remittance time, a remittance period, a notification method, and pre-authorization.

8. The electronic device of claim 1, wherein the processor is further configured to obtain additional remittance information through a second user interface of the second application if the time arrives.

9. The electronic device of claim 1, wherein the processor is further configured to display, on the display, a second user interface of the second application that includes an option for delaying the remittance if the time arrives.

10. The electronic device of claim 1, wherein the processor is further configured to display, on the display, a second user interface of the second application including an option for cancelling the remittance if the time arrives.

11. The electronic device of claim 1, wherein the processor is further configured to automatically set the scheduled time.

12. The electronic device of claim 1, wherein the processor is further configured to authenticate the user of the electronic device using the second application every remittance period if a remittance period is included in the remittance information.

13. The electronic device of claim 1, wherein the processor is further configured to:
    authenticate the user of the electronic device based on the biometric information, obtained by the biometric sensor, using the second application when obtaining the remittance information; and
    request the remittance to the server based on at least the part of the remittance information using the communication circuit if the time arrives.

14. The electronic device of claim 1, wherein the processor is further configured to request the remittance to the server based on at least the part of the remittance information using the communication circuit if the user of the electronic device is not authenticated for a specified period of time after the time arrives.

15. The electronic device of claim 1, wherein the processor is further configured to send the remittance information to an external device using the communication circuit.

16. A remittance method of an electronic device, the method comprising:
    executing a first application;
    obtaining remittance information including time information from the first application, wherein the time information includes a scheduled time to perform remittance;
    determining that a time, corresponding to the scheduled time to perform the remittance, arrives;
    authenticating, in response to the determination that the time arrives, a user of the electronic device based on biometric information using a second application for payment;
    requesting the remittance to a server based on at least a part of the remittance information, and based on the determination that the time arrives, if the user of the electronic device is authenticated;
    determining that the authentication of the user is not provided within a specified period of time after the time arrives;
    selecting a forced remittance mode in response to the determination that the authentication of the user is not provided; and
    requesting, based on the selection of the forced remittance mode, performance of remittance while omitting user authentication.

17. An electronic device comprising:
    a display;
    a communication circuit configured to communicate with a server;
    a biometric sensor configured to sense biometric information; and
    a processor electrically connected with the display, the communication circuit, and the biometric sensor,
    wherein the processor is configured to:
        obtain remittance information including time information, wherein the time information includes a scheduled time to perform remittance;
        determine that a time, corresponding to the scheduled time to perform the remittance, arrives;
        authenticate, in response to the determination that the time arrives, a user of the electronic device based on the biometric information obtained by the biometric sensor;
        request the remittance to the server based on at least a part of the remittance information, and based on the determination that the time arrives, using the communication circuit if the user of the electronic device is authenticated;
        determine that the authentication of the user is not provided within a specified period of time after the time arrives;
        select, based on determination that the authentication of the user is not provided within a specified period of time after the time arrives, a forced remittance mode in response to the determination that the authentication of the user is not provided; and
        request, based on the selection of the forced remittance mode, performance of remittance while omitting user authentication.

* * * * *